US006678097B2

(12) United States Patent
McKenney

(10) Patent No.: US 6,678,097 B2
(45) Date of Patent: Jan. 13, 2004

(54) NON-PLANAR FRESNEL REFLECTOR ARRAYS, MOLD STRUCTURES AND MOLD PATTERNS FOR ELIMINATING NEGATIVE DRAFT DURING MOLDING

(75) Inventor: David I. McKenney, Orangevale, CA (US)

(73) Assignee: Honeywell International Inc., Morristown, NJ (US)

( * ) Notice: Subject to any disclaimer, the term of this patent is extended or adjusted under 35 U.S.C. 154(b) by 86 days.

(21) Appl. No.: 10/007,311

(22) Filed: Nov. 8, 2001

(65) Prior Publication Data

US 2002/0186566 A1 Dec. 12, 2002

Related U.S. Application Data

(60) Provisional application No. 60/288,737, filed on May 4, 2001.

(51) Int. Cl.[7] .................................................. G02B 3/08
(52) U.S. Cl. ........................ 359/742; 359/797; 359/811; 359/546
(58) Field of Search ............................... 359/741, 742, 359/546, 796, 797

(56) References Cited

U.S. PATENT DOCUMENTS

| 4,108,540 A | 8/1978 | Anderson et al. |
| 4,617,463 A | 10/1986 | Muirhead |
| 5,442,178 A * | 8/1995 | Baldwin .................... 250/353 |
| 5,718,849 A * | 2/1998 | Maus et al. .................. 264/2.2 |
| 5,926,320 A | 7/1999 | Parkyn, Jr. et al. |

FOREIGN PATENT DOCUMENTS

| EP | 0 193 294 | 9/1986 |
| GB | 2 205 156 | 11/1988 |
| GB | 2 332 638 | 6/1999 |
| JP | 63 282091 A | 11/1988 |

* cited by examiner

Primary Examiner—Scott J. Sugarman
Assistant Examiner—Darryl J. Collins
(74) Attorney, Agent, or Firm—John P. O'Banion

(57) ABSTRACT

A non-planar Fresnel reflector array mold pattern and fabrication method are described which can be utilized to manufacture integral non-planar Fresnel reflector arrays which are not subject to molding inclusions. The Fresnel reflector segments comprising the mold pattern are joined at angles to one another and incorporate off-axis Fresnel segments at segment positions in which the optical axis of the segment is not sufficiently parallel to the intended pull direction of the associated mold. The focal point of each off-axis segment lies along a path that is angularly offset from the optical axis of said segment. The use of properly oriented off-axis Fresnel segments within the non-planar Fresnel array result in the elimination of molding inclusions. The mold pattern thus created may be positive or negative, and provides the three-dimensional pattern from which the final manufacturing molds or tools are created.

16 Claims, 23 Drawing Sheets

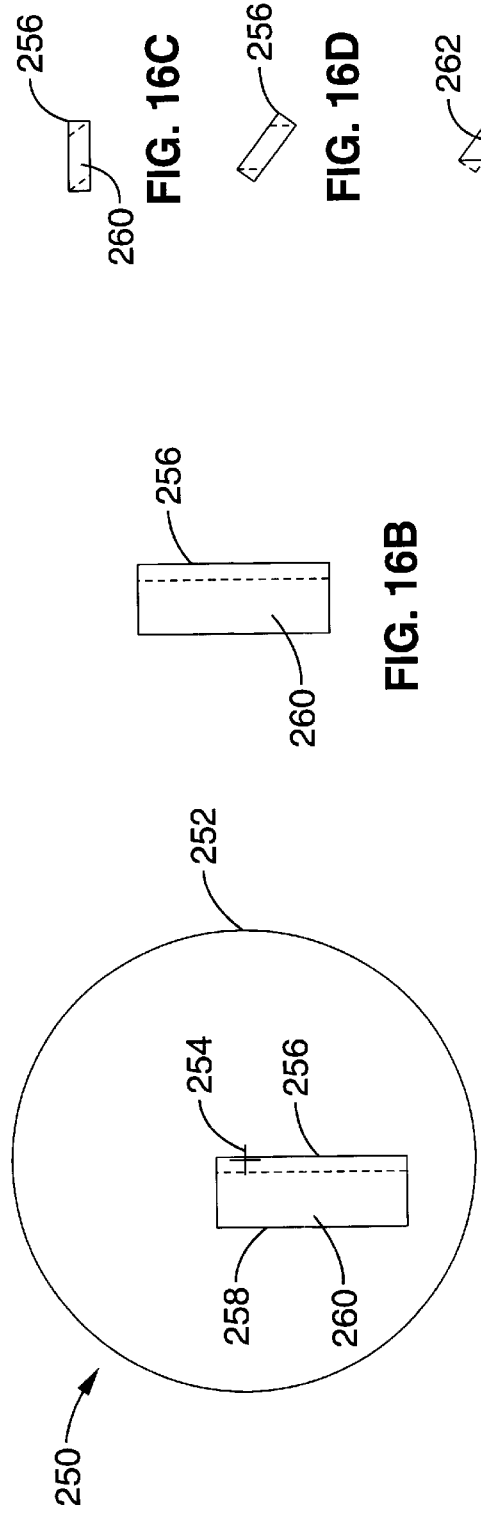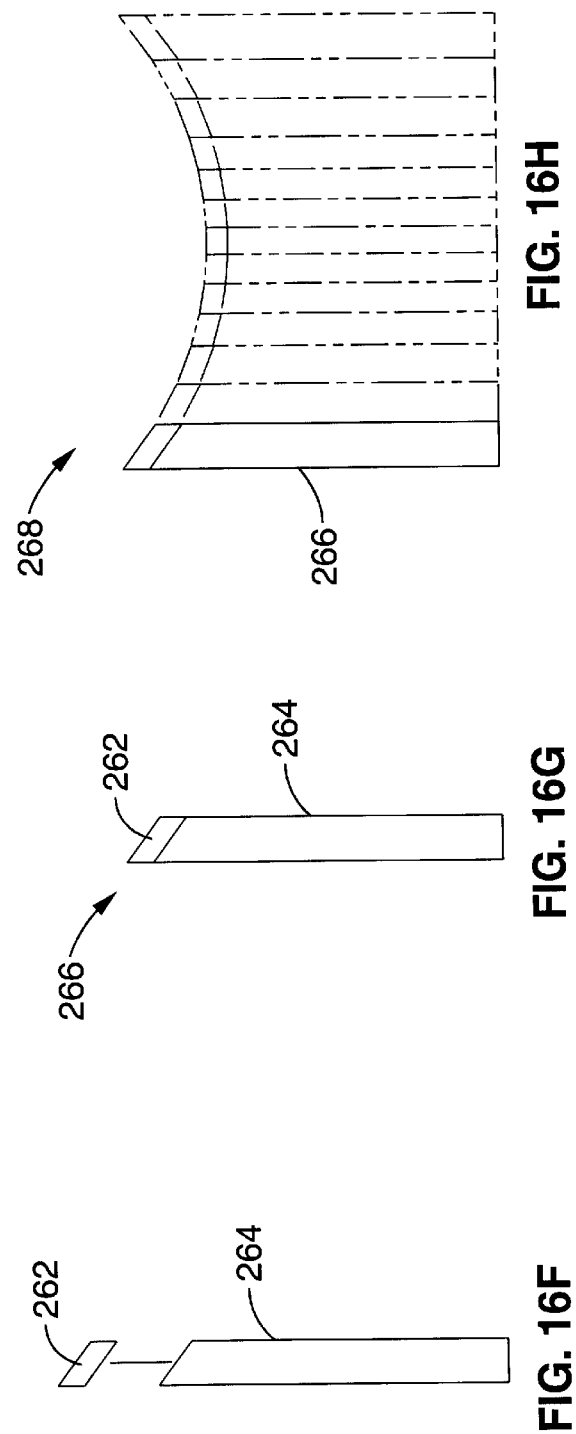

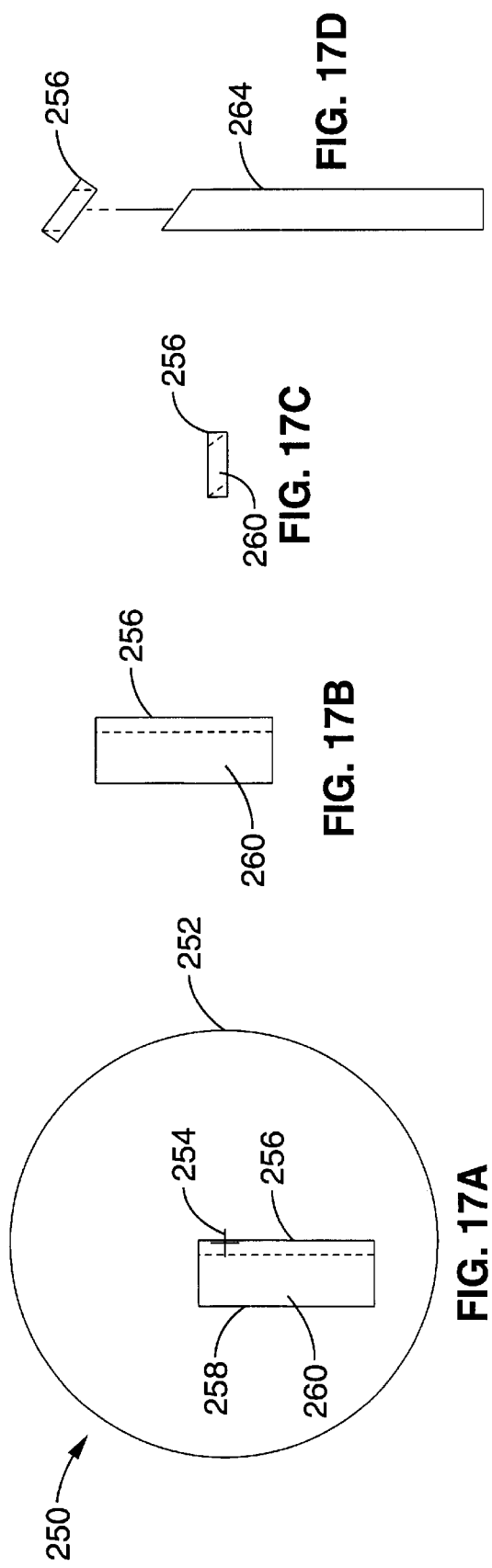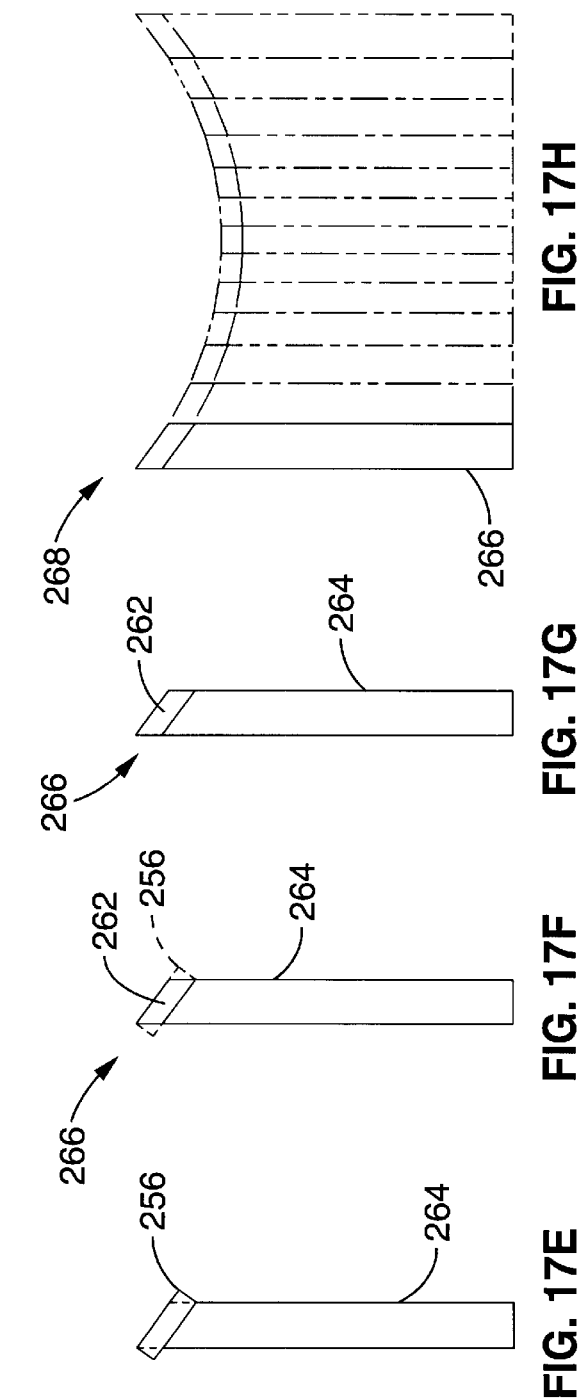

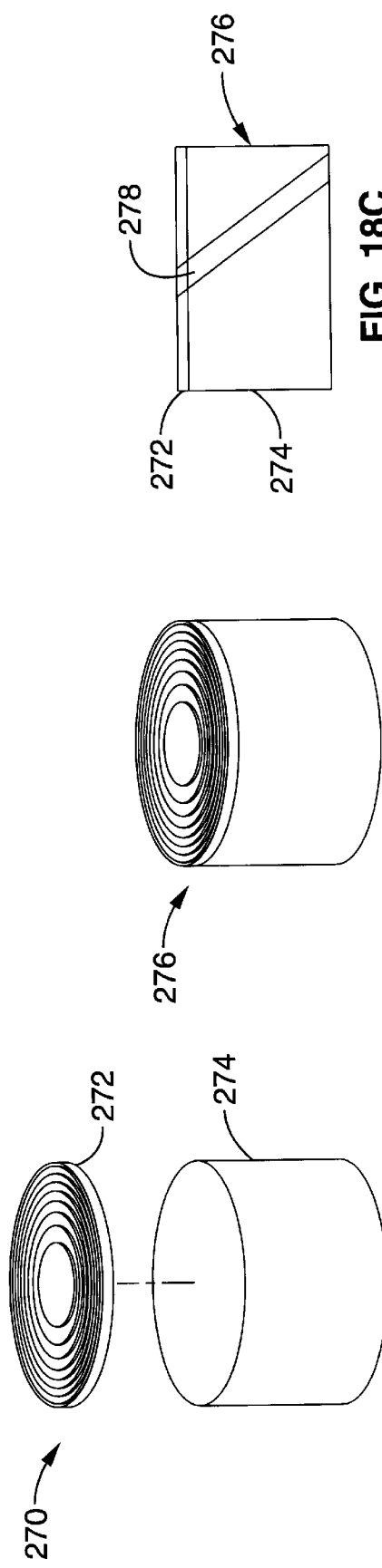
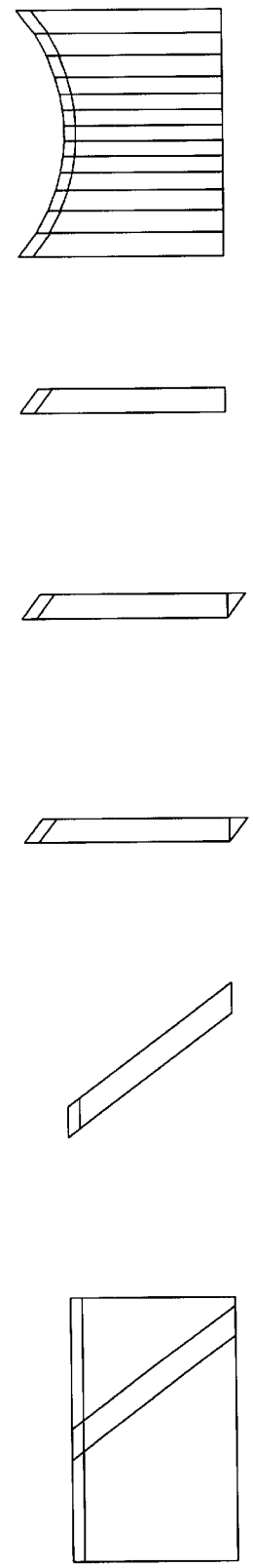

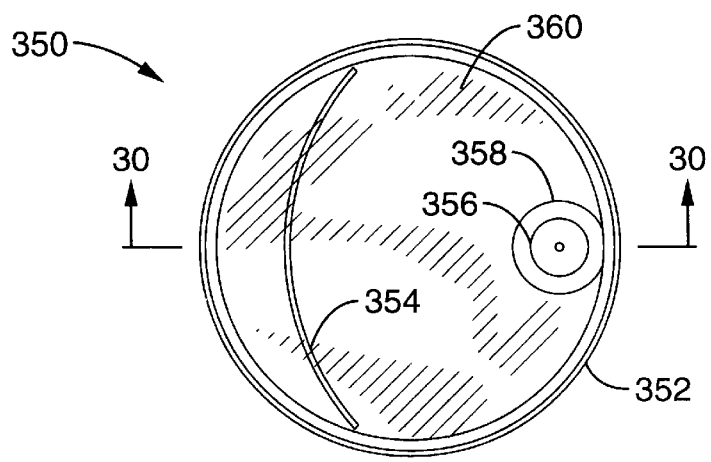
FIG. 29
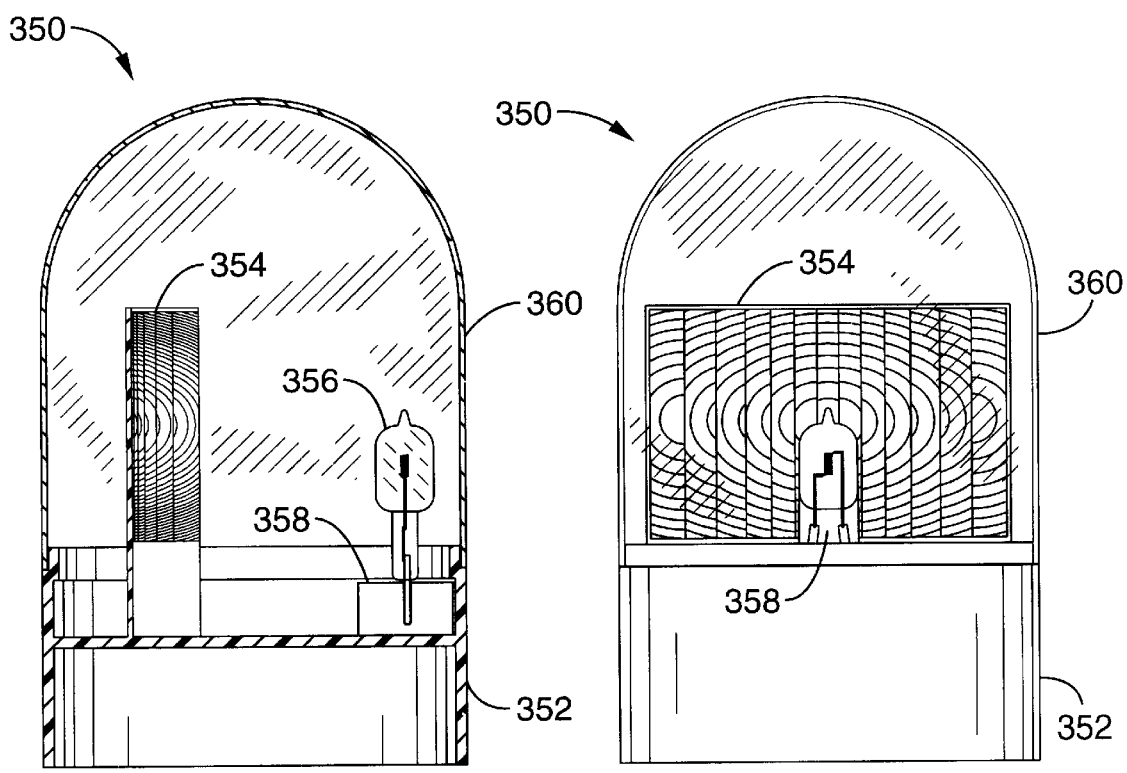
FIG. 30  FIG. 31

US 6,678,097 B2

NON-PLANAR FRESNEL REFLECTOR ARRAYS, MOLD STRUCTURES AND MOLD PATTERNS FOR ELIMINATING NEGATIVE DRAFT DURING MOLDING

CROSS-REFERENCE TO RELATED APPLICATIONS

This application claims priority from U.S. provisional application Ser. No. 60/288,737 filed on May 4, 2001, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

This invention pertains generally to Fresnel reflectors, and more particularly to monolithic non-planar Fresnel reflector arrays, and mold patterns and mold structures for manufacturing the arrays which eliminate or substantially reduce negative draft during molding.

2. Description of the Background Art

Reflectors are often utilized within various detector and illumination assemblies to focus incident radiation onto a detector (sensor), or to direct radiation emitted from an illumination source toward specific directions. For example, a Fresnel reflector is capable of focusing radiation from a dispersed target zone onto a focal zone, and for directing radiation emanating from an illumination source located near the focal zone to a dispersed target zone. The focal zone comprises a volume that is at, or generally near, the focal point of the reflector. Fresnel reflectors are often utilized to reduce the size and cost of a reflector within a given application. Each Fresnel reflector comprises a series of joined reflector segments configured as rings that may be of a similar shape and/or angle to the sections within an equivalent curved reflector, such as spherical, aspheric, parabolic, or hyperbolic. The rings in a simple Fresnel reflector, however, are placed concentrically on a single plane with steps leading from one ring to the next. Fresnel reflectors may be employed for either focusing radiation, or dispersing radiation, such as radiation found within the visible, infrared, or ultraviolet spectrums.

Motion sensors utilized in alarm systems make extended use of these Fresnel reflectors for focusing radiation, such as at visible, near-infrared, and infrared wavelengths toward a suitable detector. Typically, the surface of the reflector is configured with a mirrored surface that reflects the optical wavelengths toward the detector. In some systems, a non-planar array of Fresnel reflector segments is utilized to collect radiation from a detection area which covers a wide angular spread. The individual Fresnel segments within the non-planar array are aligned adjacent one another at angles to form a generally curved shape. Often complex reflectors are created utilizing multiple tiers of these non-planar arrays, whereas the combination of tiers are typically configured with a single focal zone.

Illumination systems, such as those utilized in the law enforcement/rescue industry and illumination systems utilized in the commercial lighting industry make extended use of Fresnel reflectors for dispersing light which emanates from an illumination source, such as an incandescent lamp, a fluorescent lamp, arc lamp, strobe, an LED (visible or infra-red), ultra-violet lamp, infrared lamp, and similar illumination sources and combinations thereof. Use of Fresnel reflectors for directing illumination is not limited to single illumination sources, as multiple illumination sources may be combined, such as LEDs generating different colors, and placed sufficiently close to the focal point of the reflector system to benefit from being directed by the reflector. Light beacons can utilize Fresnel reflectors in a number of ways. For example, reflectors being utilized for general illumination purposes can be constructed with fixed reflectors to distribute light from an illumination source. For example, the mirrored Fresnel reflector can be utilized to create a regular pattern of bright spots such as radial patterns of bright bars and star effects, and so forth. Rotating emergency beacons can be designed, for instance using a halogen light around which a mirrored Fresnel reflector assembly is rotated.

A conventional single-tier non-planar Fresnel array is shown in FIG. 1 having segments which direct radiation to, or from, a focal point. The figure illustrates radiation being received from a radiation source in the target zone and reflected from the reflector toward a pyro-electric detector. It will be appreciated that Fresnel arrays for the visible portion of the electromagnetic spectrum are typically manufactured from injection molded plastic to which a mirrored surface is applied, and that each Fresnel segment generally comprises an on-axis center section of a Fresnel reflector.

FIG. 1 depicts a conventional, single-tier, non-planar Fresnel reflector array 10 comprising the following series of joined Fresnel segments: first segment 12, second segment 14, third segment 16, fourth segment 18, and fifth segment 20. Each of the Fresnel segments within the array has an optical axis centered within the center ring of the Fresnel reflector. Light paths 22, 24, 26, 28, 30, are shown extending between the center of each segment 12, 14, 16, 18, 20, respectively, to a detector 32 (shown in phantom) having a focal point FP. The dashed line of the light paths represents the center of the light which reflects from reflector 10. Detector 32 is preferably positioned within the focal zone of the Fresnel reflector which is sufficiently near focal point FP to provide the desired pattern of reflection. In the figure, Fresnel segments 12, 14, 16, 18, and 20, are generally arranged so that the focal point of each Fresnel segment is aligned with focal point FP of detector 32. Radiation is exemplified as being received from a central portion 34 of a target zone 36, which may be referred to as a detection area, or detection zone, within an alarm system. It will be appreciated that the light path from the target zones to reflector 10 is shown overlapping the light path from reflector 10 to detector 32. It should also be appreciated that descriptions reciting the focusing of radiation onto a sensor or detector at the target zone or focal point, are generally applicable in the reverse direction for directing illumination away from an illumination source at the target zone, or focal point, and distributing the illumination according to the reflection pattern of the Fresnel lens. An angular offset, perpendicular to the plane of the illustrations, allows the radiation to pass underneath the detector for receipt by the segments of the non-planar Fresnel reflector array and subsequent reflection onto the detector. The non-planar Fresnel array is shown configured to receive radiation for a given arc of the target zone, wherein the inner three segments receive radiation from a first angular spread 34, such as forty five degrees (45°), and the exterior two segments extend the angle to a second angular spread 36, such as ninety degrees (90°). It will be appreciated that an alarm system utilizing the illustrated non-planar Fresnel reflector may have greater sensitivity to radiation being received from the first angular spread 34, due to increased levels of radiation being coupled from the reflector to the detector. Furthermore, the Fresnel segments extending from center segment 16 are retained at progressively increasing angles in relation to center segment 16 in order to retain focus on focal point FP of detector 32. A first tilt angle 38 is illustrated as 22.50 degrees, and a second tilt angle 40 is shown at an angle of 45.00 degrees. Joints 42, 44, 46, 48, between the Fresnel segments provide retention of the segments at the desired angle, although the segments may be mounted to a backing assembly to retain proximal retention of the adjacent segments. The Fresnel reflector tier of the figure is molded as five separate reflectors which are then joined to one another, or otherwise retained proximal to one another. It should be appreciated that a single mold incorporating the five segments of Fresnel array 10 as a monolithic structure would be subject to inclusive draft within the mold, irrespective of the chosen mold release pull direction. Given a particular pull direction 50, a monolithic molded structure of non-planar Fresnel array 10 would contain inclusions within region 52 of each Fresnel segment that is non-orthogonal to the pull direction. The inclusive draft regions 52 being depicted between opposing brace symbols which bracket the regions subject to inclusive draft. In relation to pull direction 50, regions 52 contain portions of the mold subject to inclusive draft, also referred to as negative draft, or undercut. Extraction of the finished part from its corresponding mold, therefore, is prevented by the interlocking of the injected plastic with the mold. Forced removal of the monolithic array is typically not an option, as even in the best cases it would substantially increase breakage and produce damaged reflector arrays. The undesired inclusive regions 52 surround each reflective ring 54 in a portion of step 56 toward a succeeding ring. Each step within a Fresnel reflector is typically formed with a surface that is directed orthogonal to the plane of the Fresnel reflector, wherein a tilt thereof causes the steps on one half of the Fresnel segment to contain inclusions.

The problems associated with molding inclusions have led to the use of inefficient methods for creating multi-element Fresnel reflectors comprising joined Fresnel segments. For example, the Fresnel segments may be molded as separate sections and joined, or the mold may be carefully modified, such as by filling in portions of the Fresnel steps which are subject to undercutting. The use of separate Fresnel reflector sections is not cost effective as it requires elements to be separately manufactured, positioned, aligned, and fastened to form a reflector array. The process, however, for changing the angle or profile of the steps between the rings is tedious and it can result in a loss of reflective area and distortions.

Therefore, a need exists to simplify the creation of non-inclusive mold patterns for use in the manufacture of non-planar Fresnel reflector arrays. The present invention satisfies that need as well as others and overcomes the deficiencies of previously developed solutions.

BRIEF SUMMARY OF THE INVENTION

The present invention provides a monolithic non-planar Fresnel reflector array mold pattern, and method of mold fabrication thereof, which simplifies molding and essentially eliminates inclusive draft. The Fresnel reflector array mold pattern of the present invention comprises a plurality of Fresnel segments that are arranged edge-to-edge at a relative angular offset to form a Fresnel reflector array, in which at least one of the Fresnel reflector segments has a focal point along a path that is angularly offset from the optical axis of the Fresnel segment. The Fresnel segments having focal points which are angularly offset from the optical axis are referred to herein as "off-axis" segments. It will be appreciated that an off-axis segment may be created having an offset in either axis, or combination thereof, within the plane of Fresnel segment. The use of off-axis segments within the Fresnel reflector array can eliminate inclusive drafts that would otherwise arise when molding a non-planar Fresnel reflector array having a plurality of Fresnel segments.

By way of example, the non-planar Fresnel reflector arrays according to the present invention are typically utilized within motion detectors associated with devices such as alarm systems, and as illumination reflectors such as found in emergency beacons or general-purpose residential illumination. It should be appreciated, however, that the use of the Fresnel arrays manufactured from mold patterns according to the present invention are not limited to motion detectors and illumination beacons, but are applicable to any device in which non-planar Fresnel arrays may be utilized. Non-planar Fresnel reflector mold patterns according to the present invention eliminate the inclusive draft exhibited by previously developed non-planar array mold patterns, while reducing the necessary angle for achieving focus on the detector which results in a reduction of the overall height of the non-planar array structure. The present invention utilizes different optical relationships for creating and orienting the constituent Fresnel segments within the mold pattern of the array. Mold patterns according to the present invention utilize Fresnel segments created from off-axis Fresnel regions, such as removed from a representative Fresnel master, which exhibit a skewed focal point that is corrected by changing the angular relationship between the segments. As a result, the steps within the off-axis segments are oriented in relation to the pull direction to eliminate inclusive draft. The resultant non-planar Fresnel reflector mold patterns focus light toward, or from, one or more focal points, or target zones. The Fresnel reflector arrays of the present invention provide a number of advantages over conventional Fresnel arrays including a reduction in the necessary array depth and the elimination of the inclusive draft so that even complex multi-tier arrays may be readily manufactured.

The teachings of the present invention are applicable to any form of segmented non-planar Fresnel reflector array. The off-axis Fresnel segments utilized according to the present invention may be from any form of Fresnel reflector including those which are configured with uniform groove depth, uniform groove width, variable groove width, or variable groove depth, or any combination thereof.

The term mold pattern as used herein, comprises a pattern that is created of suitable material and mold polarity, either positive or negative, that may be utilized with any number of interceding steps between the making of an original pattern and the resultant tool that is utilized during the manufacture of the final non-planar Fresnel array reflector parts. For example, a negative mold pattern can be created from a tool grade material, wherein after assembly it can be directly utilized as the tool. Generally, however, the mold pattern is created from easily workable materials and utilized for molding the next in a succession of intermediate molds before the creation of the final tool used in manufacturing. Often electroforming is employed within the process of creating molds from mold patterns. It will be appreciated that the front surface of the manufacturing tool from which the final parts are molded is substantially identical to the original mold pattern which is formed in a polarity suited to the sequence of steps used in progressing from a mold pattern to a final tool, or manufacturing mold.

By way of example, a method is described for creating a mold pattern for a non-planar Fresnel reflector array following the generalized steps of: (1) determining the shape and "cut" of a segment as based on final position within a populated reflector array wherein segments that will be oriented non-orthogonally to the pull direction of the Fresnel array are cut from off-center portions of the representative Fresnel master; (2) severing segments from a Fresnel master that is constructed of any material appropriate to the succeeding steps toward the creation of the final manufacturing mold wherein the interior edges of the severed segments are configured for attachment to adjacent Fresnel segments within the array; (3) joining the segments into a three dimensional mold pattern. The center ring, or curved facet, portion of each off-axis Fresnel reflector segment is therefore bisected by an edge of the off-axis Fresnel reflector segment, that edge being oriented toward the center of the array which preferably contains an on-axis segment. It will be appreciated that the side of the Fresnel reflector segment associated with the edge that bisects a portion of the center ring preferably contains the largest percentage of the center ring.

It will be appreciated that prior to assembling the array, the Fresnel segments may be joined to an intermediate element, such as an angled block, or joined to a structure configured for retaining the segments in an aligned position. The segments may be aligned in a number of ways within the array, such as positioning each segment at a radial distance, from reflective face to focus, which has a predetermined relationship; such as at a fixed radial distance, or a distance characterized by a specific mathematical function, such as parabolic. Another example method provides for aligning the reflector segments in response to the physical joints that are created between each segment, wherein joints are created having an interface with a particular set of characteristics; for example, orienting the faces of the segments such that the joint between each set of elements is substantially flush and continuous.

In the process of severing a segment from a Fresnel master, the edges of the segment are cut, or shaped, to facilitate joining with adjacent segments. Generally, it is desirable to eliminate gaps in the reflector surface to maximize surface area and strength, however, this is not a precondition of the present invention. To eliminate the gaps, the edges of adjacent segments are cut to join to one another with a maximum amount of mating surface area when the segments are correctly positioned within the array. The edges of the segments may be cut in various ways to maximize the joint area. For example, "miter" style joints may be utilized wherein the edge angle on adjacent segments is complementary, or parallel cuts may be made facing a particular direction in relation to the final non-planar array. It is preferred that the segments be cut with parallel severing lines such that the surfaces of the resultant joint between adjacent segments is parallel to the direction of pull to thereby allow for changes in surface alignment from one segment to the next without altering the overall width of the Fresnel array or contributing inclusions when misalignment at the surface occurs.

The process of severing segments from a Fresnel master is described in terms of separating, or cutting, a section (typically rectangular) from a Fresnel blank, or master, of the appropriate material and polarity. A variety of methods may be utilized for severing a segment from the master, such as saw cutting, laser cutting, EDM cutting (electro-discharge machining), fluid cutting, and so forth. Although cutting is a preferred method, it should be appreciated that segments which correspond with, or represent, a given portion of a Fresnel master may be fabricated in a number of additional ways. For example, subtractive methods such as grinding or etching may be utilized to remove material within the blank to arrive at the final Fresnel segment. In addition, additive processes may be utilized to create a segment formed into the correct size, shape, edge configuration, and pattern of rings and steps that are equivalent to that of a segment being severed from a Fresnel blank, or master. In addition, articles of any shape may be formed within solids fabrication systems wherein Fresnel segments may be created having a size, shape, and ring pattern homologous with a segment being cut from a Fresnel master. It should be appreciated that a Fresnel master is typically a Fresnel reflector pattern in the form of a blank Fresnel reflector, typically circular. A non-planar Fresnel array mold pattern may be created by assembling portions from a series of Fresnel masters, or equivalent sections thereof. It will be appreciated that Fresnel portions that are fabricated by methods other than severing from a Fresnel master will still contain a pattern which corresponds to a given representative Fresnel master.

An object of the invention is to provide a monolithic non-planar Fresnel reflector array mold pattern which is free of molding inclusions.

Another object of the invention is to provide a monolithic non-planar Fresnel reflector array mold pattern in which the step and ring geometry of the Fresnel segments do not require modifications to eliminate inclusions.

Another object of the invention is to provide a method of making Fresnel array mold patterns which are not subject to mold inclusions.

Another object of the invention is to provide a mold pattern utilizing segments from Fresnel reflector masters without regard to reflector type, which by way of example can include uniform groove depth, uniform groove width, variable groove width, variable groove depth, combinations thereof, as well as other forms of Fresnel reflectors.

Another object of the invention is to provide a mold pattern for a non-planar Fresnel reflector array wherein the structure of the joint between successive segments is not subject to inclusions.

Another object of the invention is to provide a method of creating mold patterns for non-planar Fresnel reflector arrays containing one or more non-planar (curving) tiers of reflector arrays.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 16A through FIG. 16H is a flow diagram schematically showing process steps in the creation of a mold pattern according to an aspect of the present invention, shown with an off-axis segment being identified, cut, angle ground, fit onto blocks, and then assembled into the mold pattern.

FIG. 17A through FIG. 17H is a flow diagram schematically showing of process steps in the creation of a mold pattern according to another aspect of the present invention, shown with an off-axis segment being identified, cut, fit onto blocks, angle ground, and then assembled into the mold pattern.

FIG. 18A through FIG. 18I is a flow diagram schematically showing process steps in the creation of a mold pattern using a wire EDM method according to another aspect of the present invention, shown using a master mounted to a backing block from which a Fresnel segment is cut and assembled into a mold pattern.

FIG. 29 is a top view of a radial pattern illuminator which incorporates a non-planar Fresnel array created according to the present invention.

FIG. 30 is a side view in cross-section of the radial pattern illuminator of FIG. 29 taken through line 30—30.

FIG. 31 is a front view of the radial pattern illuminator of FIG. 30 showing the Fresnel reflector.

DETAILED DESCRIPTION OF THE INVENTION

Referring more specifically to the drawings, for illustrative purposes the present invention is embodied in the apparatus and methods generally shown in FIG. 2 through FIG. 35. It will be appreciated that the apparatus may vary as to configuration and as to details of the parts, and that the method may vary as to the specific steps and sequence, without departing from the basic concepts as disclosed herein.

Figure 2:
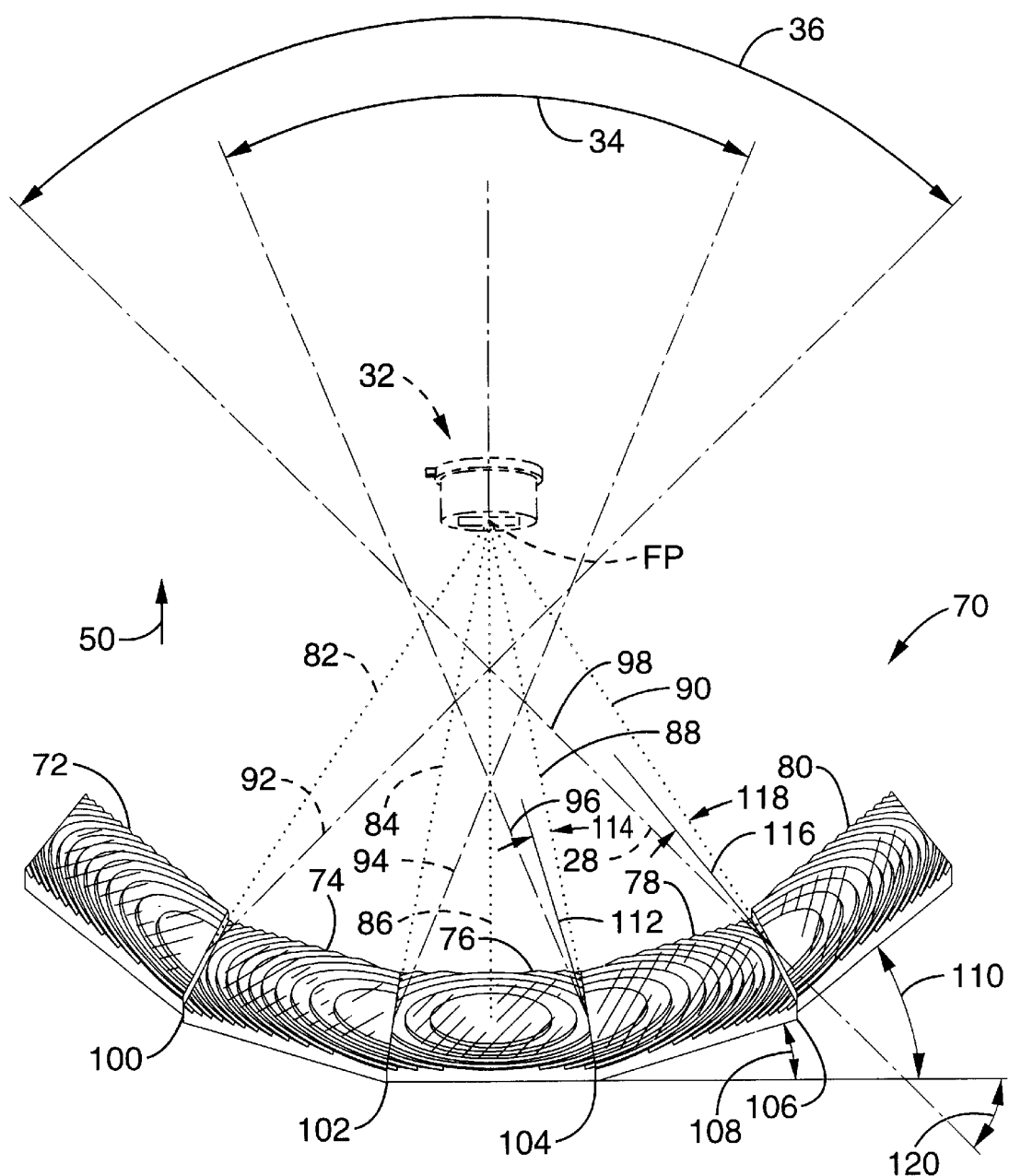
FIG. 2 is a perspective view of a non-planar Fresnel reflector array according to an embodiment of the present invention and shown incorporating off-axis Fresnel segments surrounding a central on-axis Fresnel segment.

Referring to FIG. 2, a non-planar Fresnel array 70 is shown according to the present invention. In the embodiment shown, the array comprises a first Fresnel segment 72, second Fresnel segment 74, third Fresnel segment 76, fourth Fresnel segment 78 and fifth Fresnel segment 80. It will be appreciated, however, that the number of segments may vary. Fresnel array 70 comprises a central conventional "on-axis" Fresnel segment 76 about which "off-axis" Fresnel segments 72, 74, 78, 80 are attached at selected angular offsets. Each off-axis segment has a focal point along a path that is angularly offset from the optical axis of the Fresnel segment. The corresponding light paths 82, 84, 86, 88, 90 from the Fresnel segments to the focal point FP of detector 32, are depicted from the centers of Fresnel segments 72, 74, 76, 78, and 80. It should be appreciated that in this figure the dashed line of light paths 82, 84, 86, 88, 90 represent the boundary, or edge, of the light being reflected from the off-axis reflector segment, because the optical center of each Fresnel segment is displaced to one side of the segment. It will also be appreciated that the center ring portions of each off-axis Fresnel reflector segment are oriented towards the Fresnel segment within the array that has the most orthogonal relationship with the intended pull direction of the mold, and is thereby least subject to inherent inclusive draft.

In the depicted non-planar Fresnel array, Fresnel segment 76 is orthogonal to the pull direction and is situated in the middle of the reflector array as a central segment. The optical centers of Fresnel segments 72, 74, 78, 80 are oriented toward central segment 76. Typically, as seen in FIG. 2, the segment which is largely orthogonal to the pull direction is configured as an on-axis Fresnel segment, such as Fresnel reflector segment 76 as no negative inclusion exists to be overcome. It will be appreciated that the centers of all non-orthogonal segments have been removed from off-axis portions of a Fresnel master, or equivalent. Preferably, the off-axis portion includes no more than about one-half, or fifty percent (50%), of the center segment of a Fresnel segment to assure the elimination of inclusions. Alternatively, the off-axis segment may include up to about sixty five percent (65%) of the center segment, however, it should be appreciated that the inclusions will only be substantially reduced, but not completely eliminated.

Figure 1:
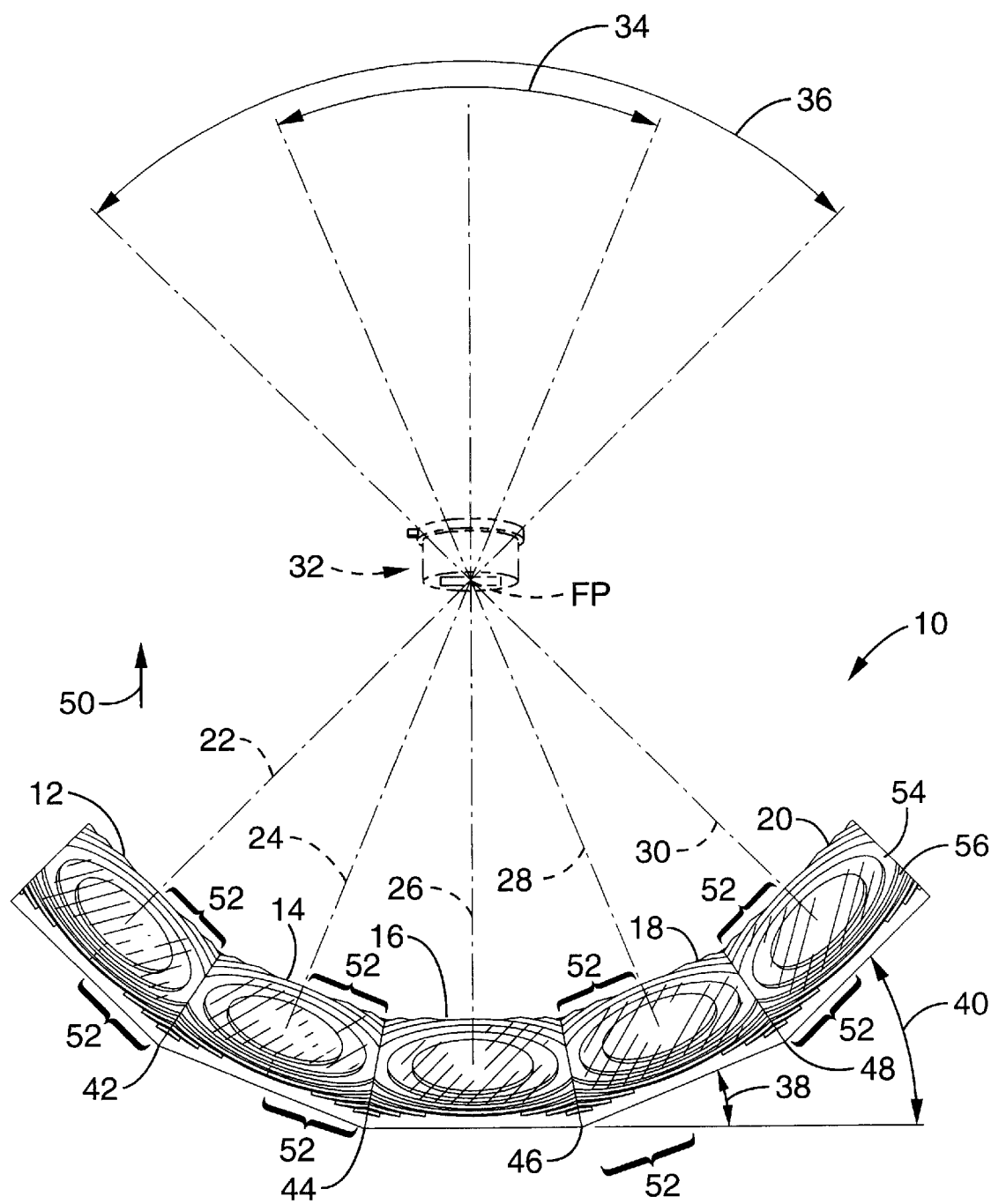
FIG. 1 is a perspective view of a conventional single-tier non-planar Fresnel reflector array having on-axis Fresnel segments shown in relation to a target zone near the focal point of the reflector.

By way of example, each of the off-axis segments 72, 74, 78, and 80 illustrated in FIG. 2 include about one-half of the center ring, or curved facet, of the Fresnel reflector. The use of off-axis Fresnel segments is contrary to conventional teaching and practice within non-planar Fresnel arrays, a tier of which were represented in FIG. 1. It should be appreciated that due to inclusions, the Fresnel array of FIG. 1 must be molded as separate sections that are joined to form the non-planar array, however, due to the use of off-axis segments and the corresponding changes to segment offset angles, the Fresnel array of FIG. 2 can be molded in a single piece to reduce manufacturing costs. The manufacture of molded parts typically follows the process, (1) creating a mold structure or pattern for the mold, (2) creating a mold from the pattern, (3) molding the final plastic parts within the mold. It should be appreciated that although array 70 is shown as a positive structure from which a mold pattern may be produced, the present invention provides mold patterns, either positive, or negative, from which integral Fresnel arrays may be manufactured.

Light paths 92, 94, 86, 96, 98, are shown from the detection zones that are incident on the Fresnel segments of the array. Center segment 76, being a non-offset Fresnel segment, exhibits an equivalent incident and reflected light path 86 on the optical axis 86 of the reflector array. As will be described, the use of off-axis centers coupled with segment angle correction results in proper focusing on the detector.

Fresnel segments 72, 74, 76, 78, 80, are attached edge-to-edge at predetermined relative angular offsets to one another at joints 100, 102, 104, 106. The various Fresnel segments comprising the Fresnel array may be joined utilizing a number of means to create a molding pattern, including the use of adhesives and backing structures to align the segments within the pattern. As a result of the present inventive method for utilizing off-axis Fresnel segments, the reflector segments can be joined within the present invention at lower tilt angles than found within conventional on-axis segments. Fresnel segments 74 and 78 are inclined in relation to center segment 76 at a first inclination angle 108, which in the illustrated example is 16.75 degrees, and can be compared to the first inclination angle of FIG. 1 of 22.50 degrees. A second inclination angle 110 for Fresnel segments 72 and 80 are at an angle of 39.15 degrees, which can be compared to the first inclination angle of 45.00 degrees in FIG. 1. In general, the angles of the Fresnel segments are determined within the present invention by the following formula:

target zone angle=mirror tilt angle+mirror off-axis angle

The preceding equation is exemplified by FIG. 2 wherein the target zone angle is given by angle 120, the mirror tilt angle by angle 110, and the mirror off-axis angle is given by angle 118.

By way of example, the calculation of angles for segments 72, 74, 78, and 80 yields: 45.00°=39.15°+5.85°. The first optical axis 112 of Fresnel segment 78, 74, is shown with the angular difference from the optical path to the detector shown as compensation angle 114, an angle of 5.85 degrees. A second optical axis 116 corresponding to the second complementary tilted Fresnel segments 72, 80, is illustrated which results in a compensation angle 118 of 5.85 degrees. The angle to detection zone 120, of 45.00 degrees, is shown in relation to Fresnel segment 80. It will be appreciated that off-axis Fresnel segments provide a similar detection pattern as found with conventional on-axis segments once the segment angles are altered in relation to the center segment. The inclusions that were evident surrounding portions of the steps within FIG. 1 have been eliminated in the non-planar Fresnel reflector according to the present invention as exemplified in FIG. 2. The steps about each of the reflector rings is open toward the direction of pull 50, wherein no areas of inclusive draft can exist. It should also be appreciated by a person of ordinary skill in the art that although shown as a single off-axis segment, the center Fresnel section 76 may be alternatively configured to comprise two or more Fresnel segments tilted and joined on a centerline.

Figure 3:
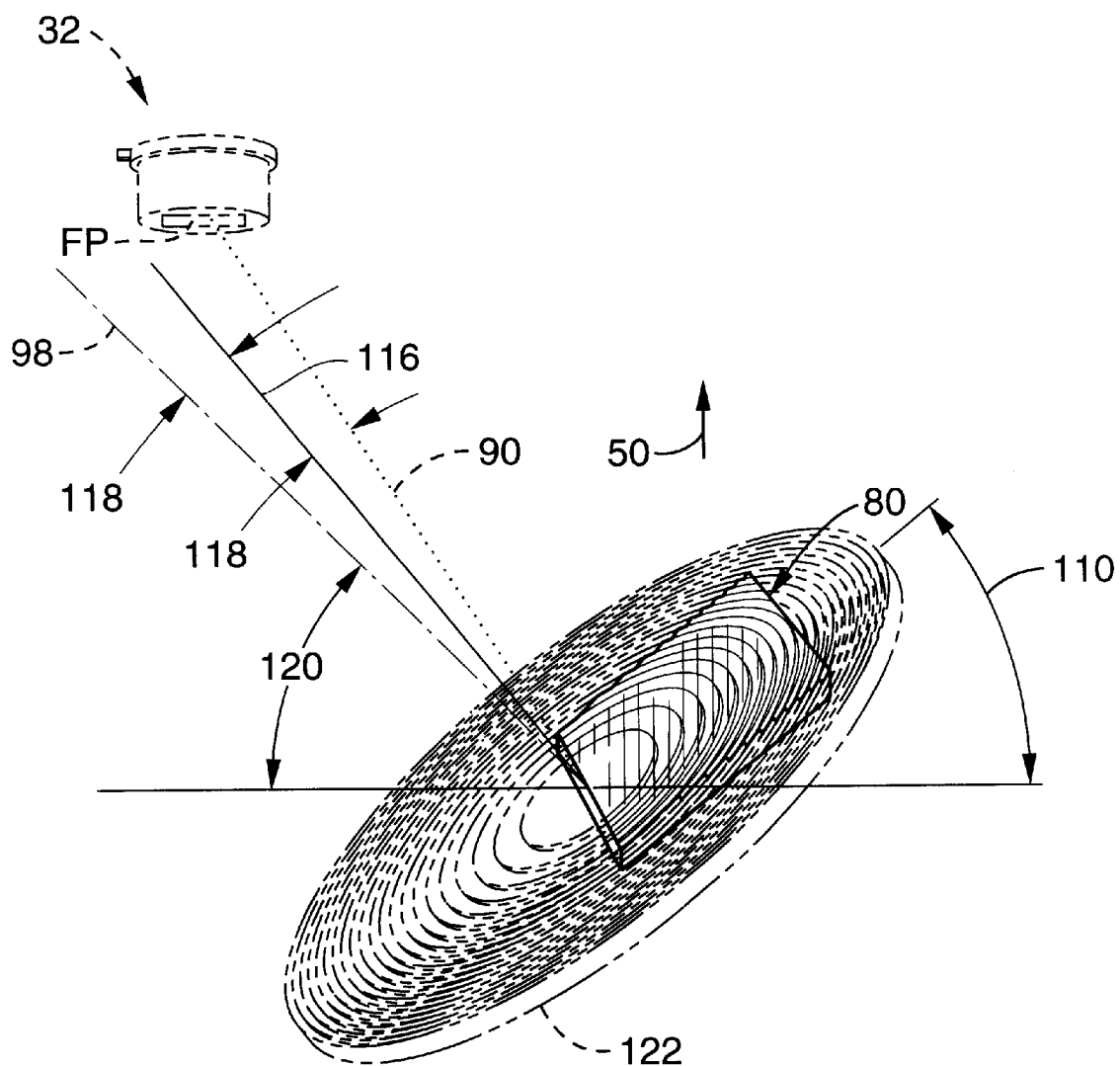
FIG. 3 is a schematic perspective view of a single off-axis Fresnel segment according to the present invention shown in relation to a Fresnel master from which it has been severed.

FIG. 3 depicts a single off-axis Fresnel segment 80 according to an aspect of the present invention shown in relation to an associated Fresnel master. Fresnel segment 80 is shown focused on detector 32 (shown in phantom). It will be appreciated that an illumination source may replace detector 32, from which illumination would then be directed by the reflector. A Fresnel master 122 is shown from which the off-axis Fresnel segment has been separated, such as by cutting, severing, or other fabrication methods to create a homologous shape representative of a portion of a Fresnel master. The relative angles are clearly visible as light follows optical path 98 from the target zone, strikes Fresnel reflector segment 80 and is reflected along optical path 90 to the detector. Alternatively, light may follow optical path 90 from an illumination source, such as a lamp filament, strike Fresnel segment 80 and be reflected along optical path 98. It will be appreciated that optical axis 116 of the light path is off-center near an edge of Fresnel segment 80, coinciding with the optical center of the associated Fresnel master. The focal point FP of detector 32, therefore, does not lie on optical axis 116 of Fresnel segment 80, or the other off-axis Fresnel segments. It should further be appreciated that in utilizing Fresnel segments separated from farther off-axis portions of the master, the center of the optical paths may be beyond the physical area of the Fresnel reflector. As illustrated in FIG. 3, the angle of incidence 118 equals the angle of reflection 118 at the optical center of the segment whereas optical axis 116 of Fresnel segment 80 bisects optical paths 98, 90 between the detection zones and the detector.

Figure 4:
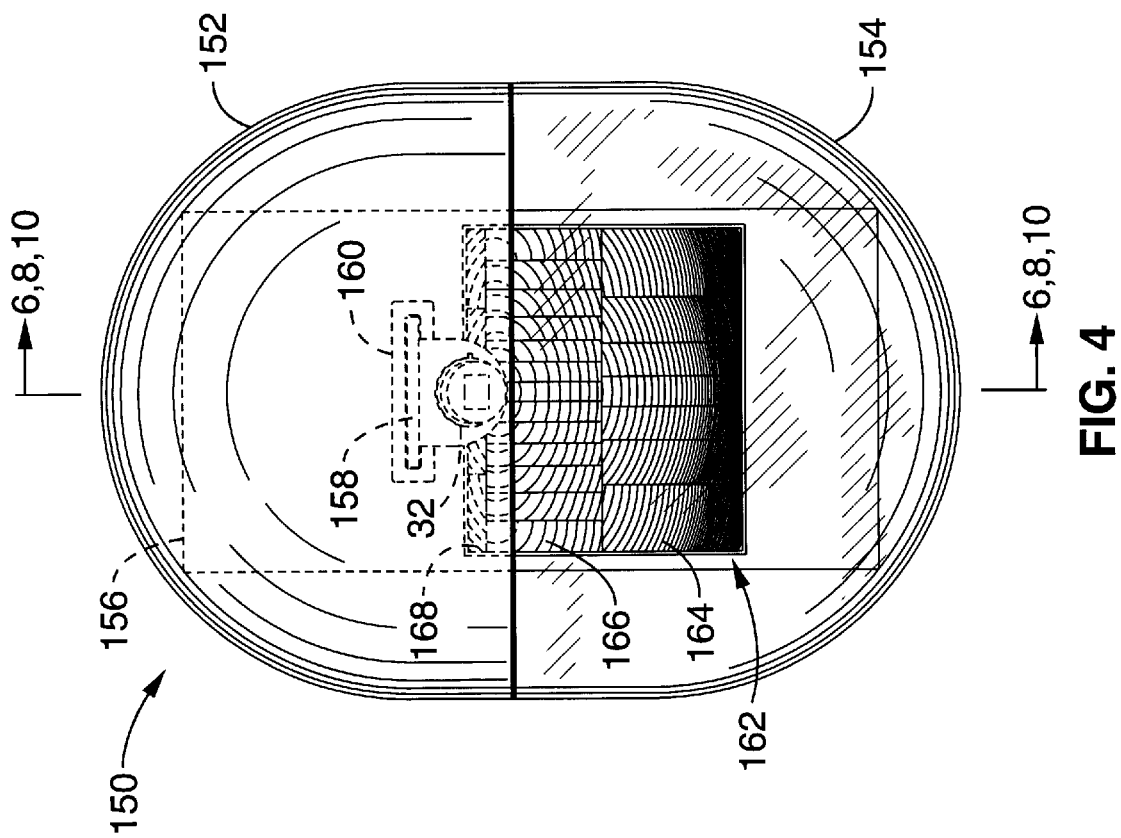
FIG. 4 is a front view of a motion detector containing a multiple-tier non-planar Fresnel reflector array incorporating off-axis segments according to the present invention, shown comprising three tiers of non-planar reflector arrays.

FIG. 4 through FIG. 11 illustrate a motion detector 150 utilizing a multi-tier Fresnel reflector array with off-axis segments according to the present invention. The illustrated motion detector is shown by way of example, and not of limitation, comprising the off-axis Fresnel reflectors according to the present invention. FIG. 4 depicts an upper housing 152, preferably opaque, attached to a lower housing 154 that is transparent to the desired detection wavelengths of the incident radiation. Preferably contained within motion detector 150 are a first printed circuit board 156 and a second printed circuit board 158 whose distal end is attached to the first printed circuit board by way of connector 160. A pyro-electric detector 32 is attached near the proximal end of second printed circuit board 158. A multi-tier off-axis Fresnel reflector 162 is attached to first circuit board 156 for collecting and focusing incident radiation towards detector 32. Fresnel reflector 162 comprises a lower-tier 164, a middle-tier 166, and an upper-tier 168 which are each formed as a combination of individual Fresnel segments, within which are included off-axis Fresnel segments, that are arranged edge-to-edge at angular offsets.

Figure 5:
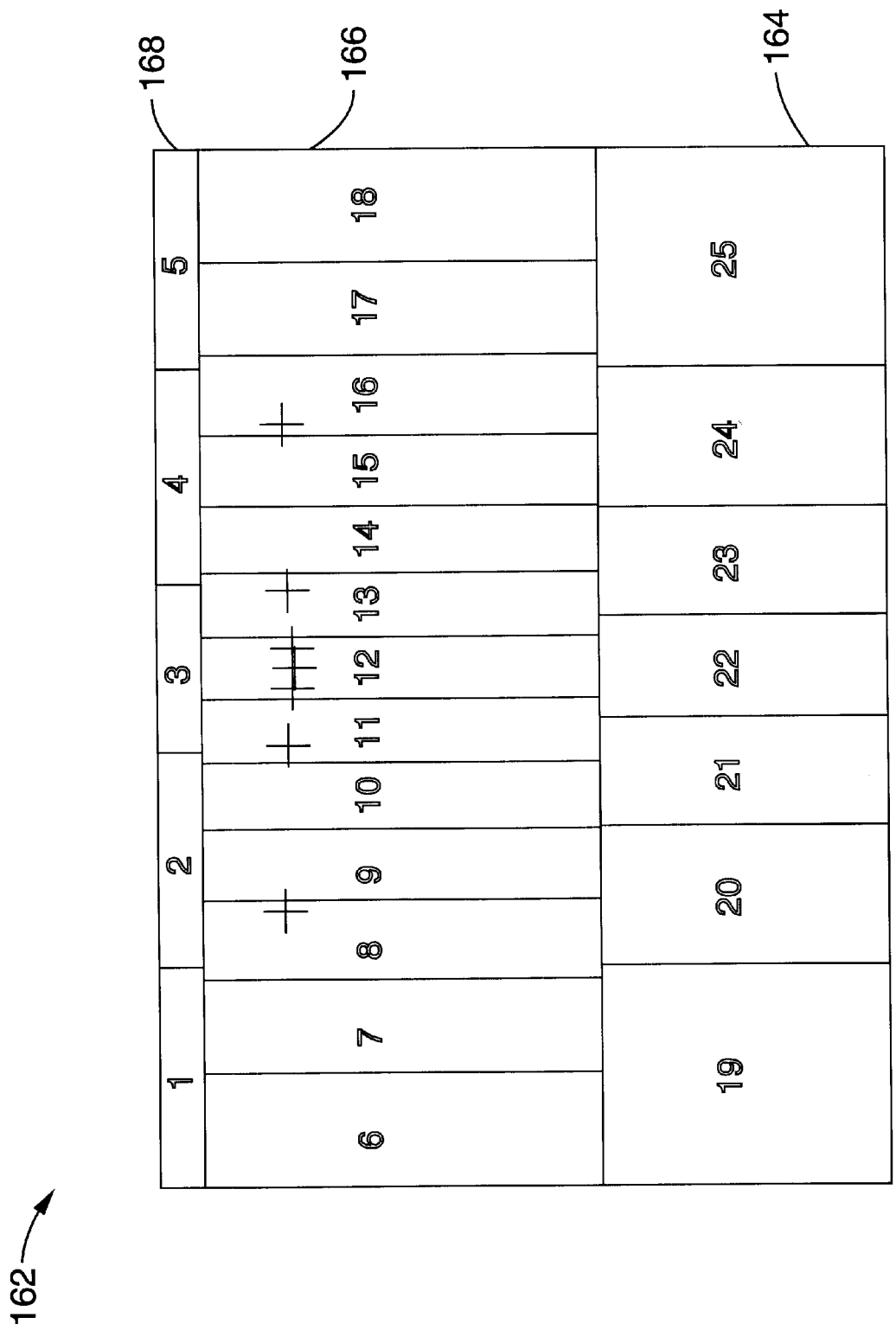
FIG. 5 is a schematic plan view of the three tier non-planar Fresnel reflector illustrated in FIG. 4 with each Fresnel segment numbered within each of the three tiers, and showing the location of the optical centers for the seven lower reflector segments as "+" signs.
Figure 6:
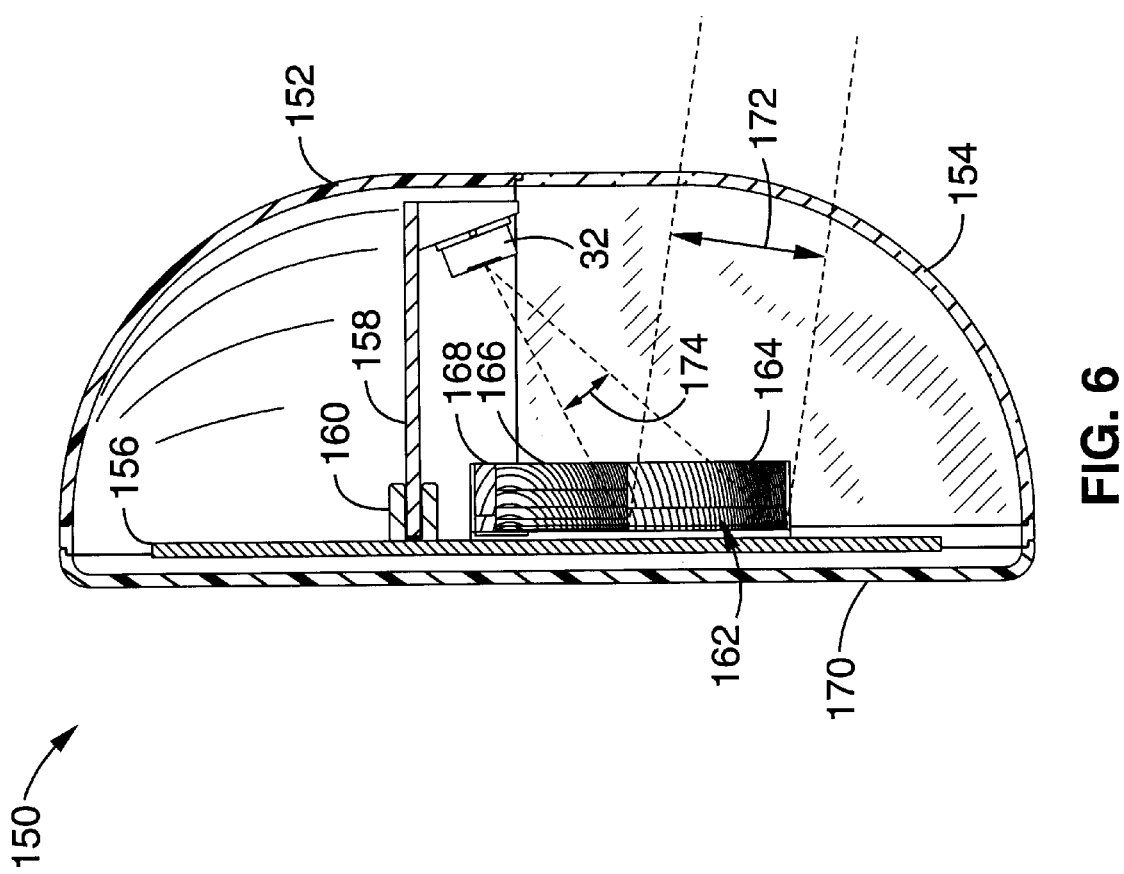
FIG. 6 is a side view in cross-section of the motion detector of FIG. 4 taken through line 6—6, showing the light path associated with the lower-tier of the non-planar Fresnel reflector array.
Figure 7:
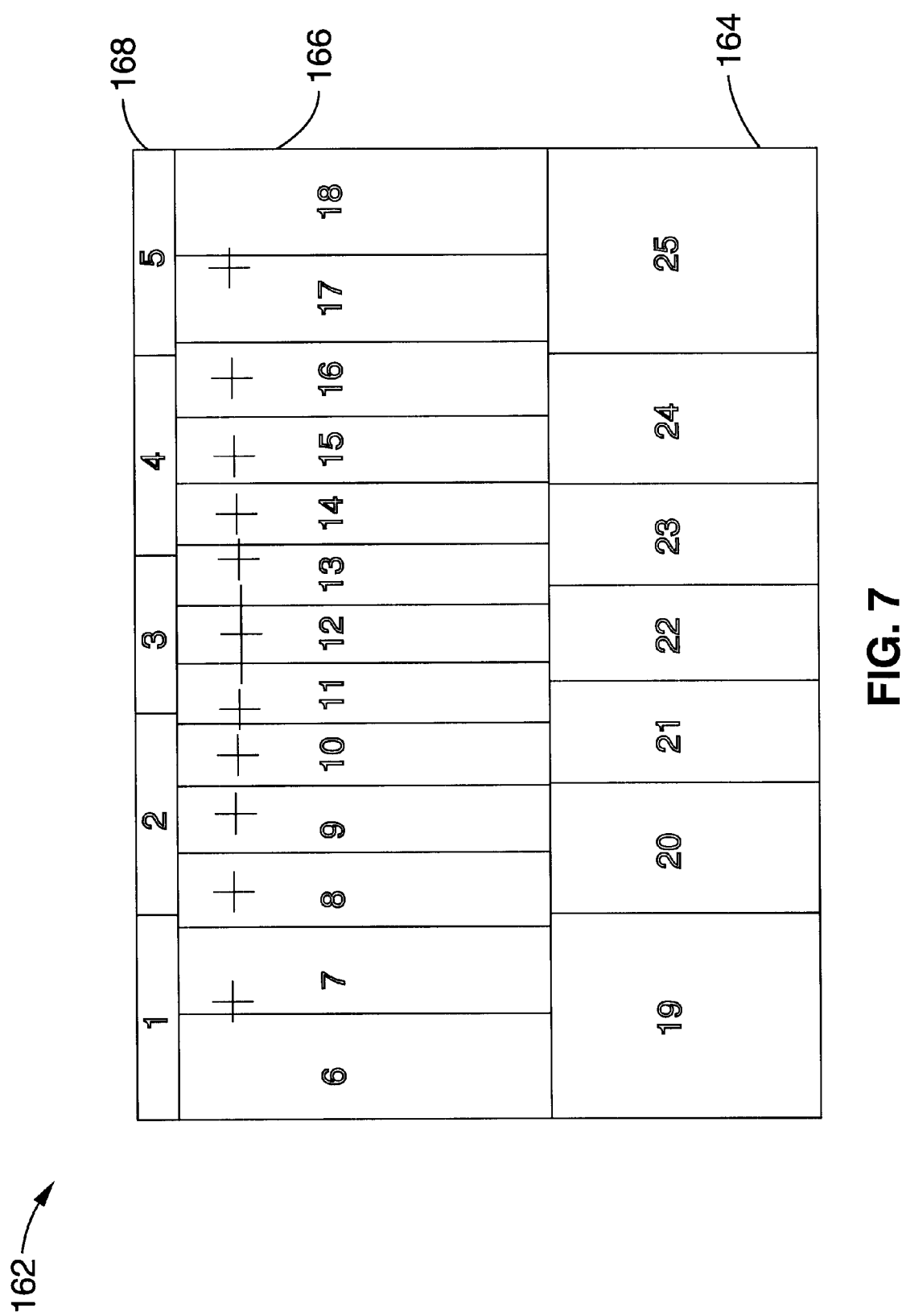
FIG. 7 is a schematic plan view of the three tier non-planar Fresnel reflector illustrated in FIG. 4 with each Fresnel segment numbered within each of the three tiers, and showing the location of the optical centers for the thirteen middle-tier reflector segments as "+" signs.
Figure 8:
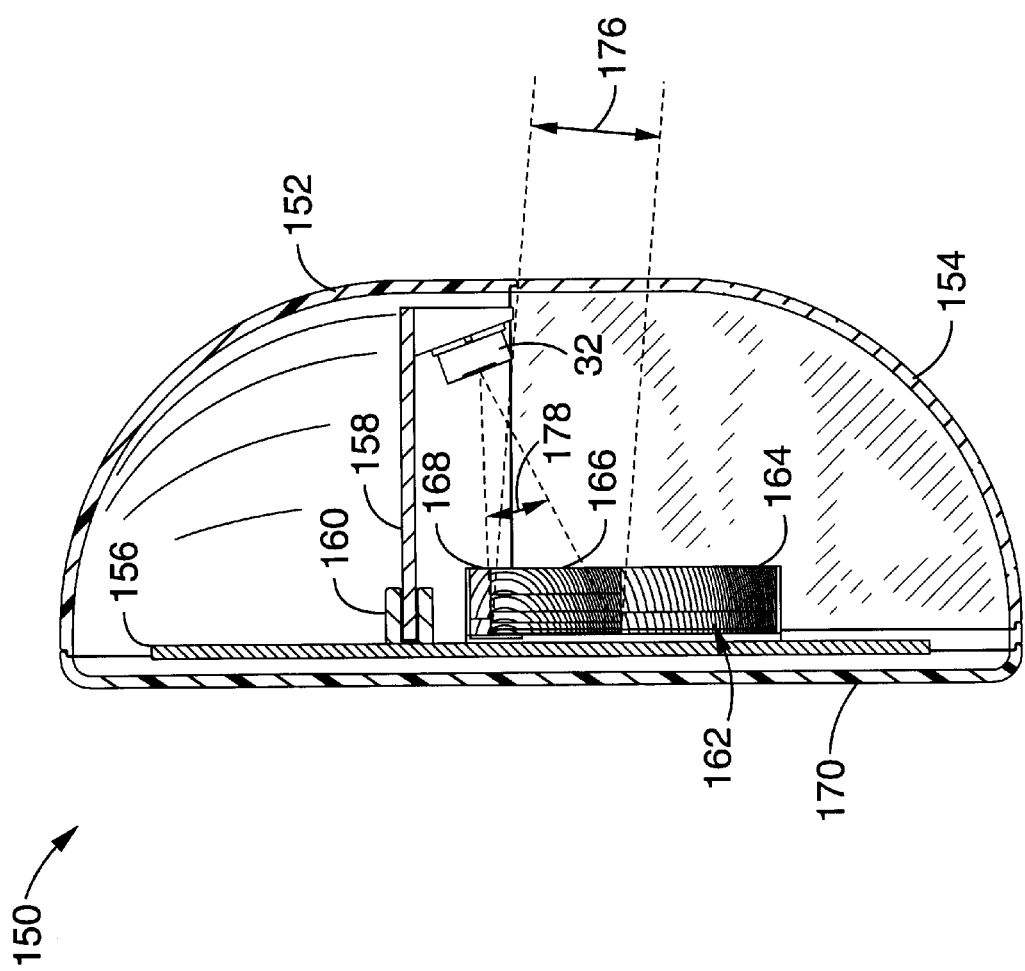
FIG. 8 is a side view in cross-section of the motion detector of FIG. 4 taken through line 8—8, showing the light path associated with the middle-tier of the non-planar Fresnel reflector array.
Figure 9:
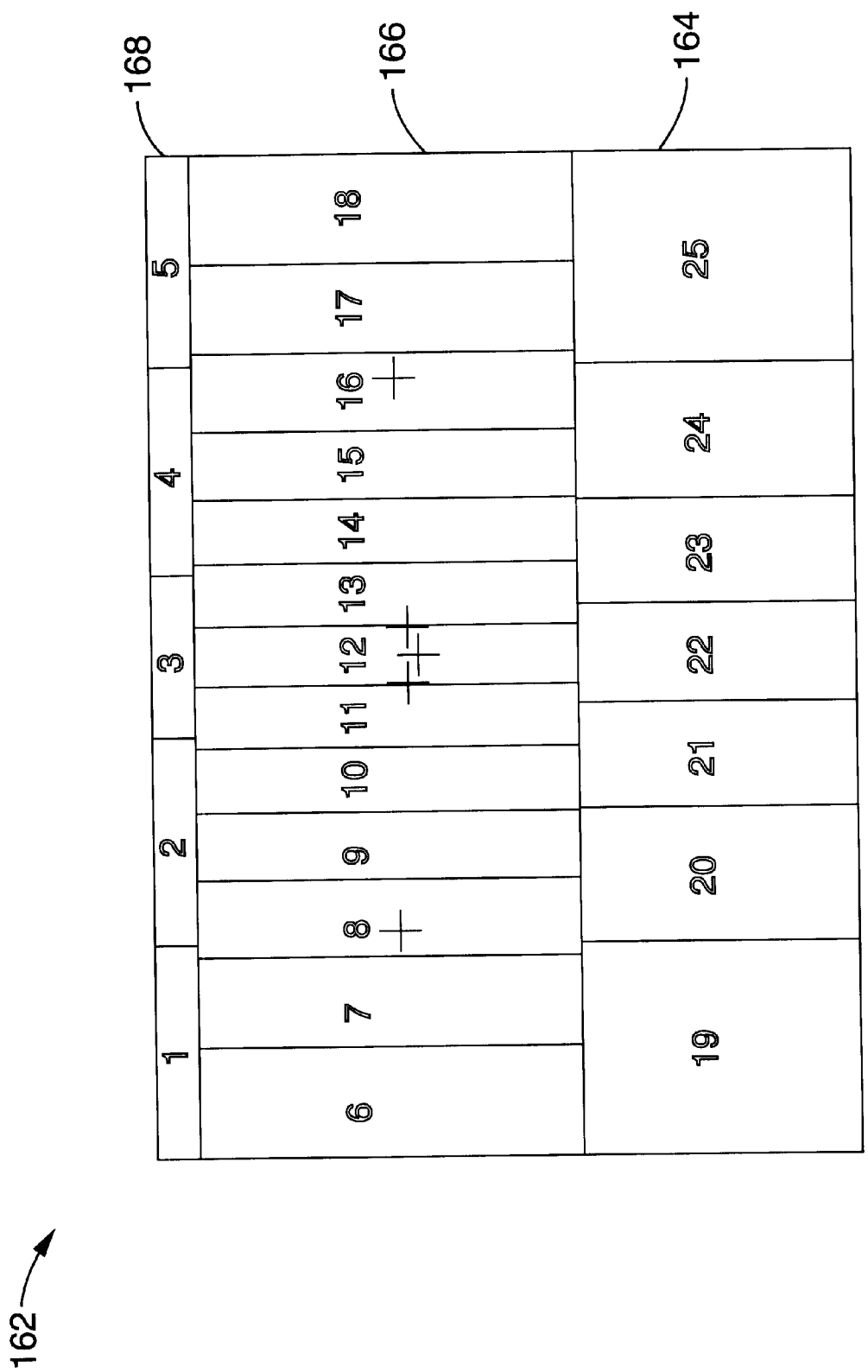
FIG. 9 is a schematic plan view of the three tier non-planar Fresnel reflector illustrated in FIG. 4 with each Fresnel segment numbered within each of the three tiers, and showing the location of the optical centers for the five upper-tier reflector segments as "+" signs.
Figure 11:
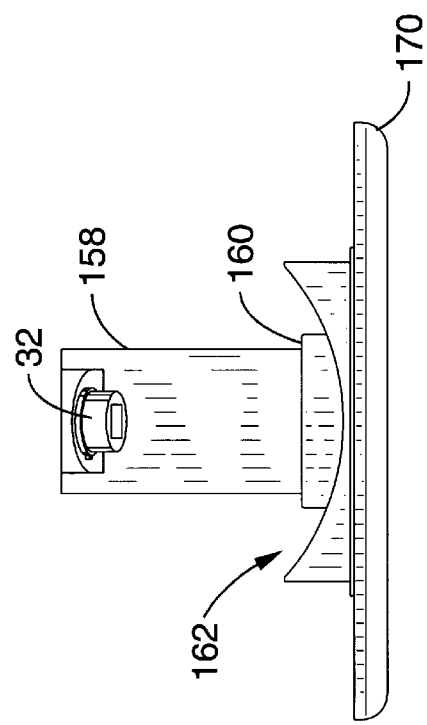
FIG. 11 is a partial bottom view of the motion detector of FIG. 4 partially disassembled and showing the curvature of the non-planar Fresnel segments toward the detector.
Figure 10:
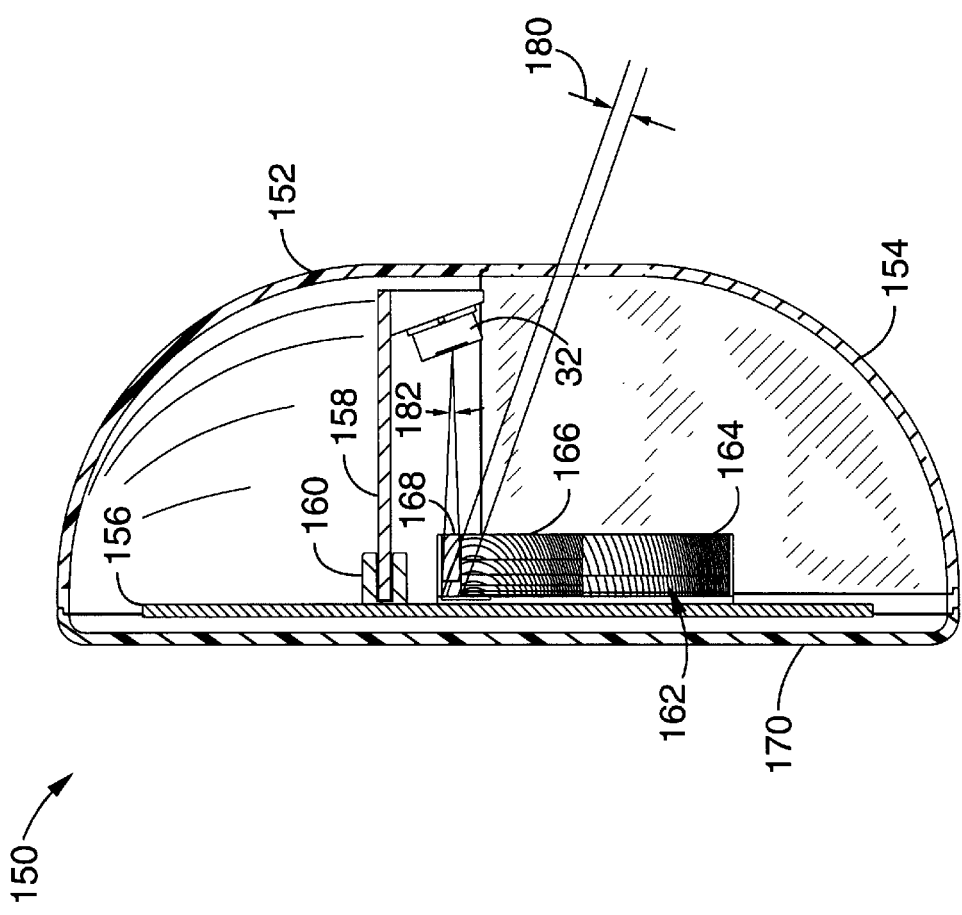
FIG. 10 is a side view in cross-section of the motion detector of FIG. 4 taken through line 10—10, showing the light path associated with the upper-tier of the non-planar Fresnel reflector array.

FIG. 5 schematically illustrates multi-tier off-axis Fresnel reflector 162 with numbered Fresnel segments contained within a lower-tier 164, a middle-tier 166, and an upper-tier 168. The optical centers of the seven Fresnel segments contained in lower-tier 164 are shown represented as "+" signs within the figure. Table 1 lists the respective tilt and width for each of the Fresnel segments within the three associated tiers of off-axis segments. It will be appreciated that the method of using off-axis Fresnel segments according to the present invention does not require that the Fresnel segments be of the same width within a given tier, or that each of the separate tiers be of equivalent composition. FIG. 6 depicts the optical path associated with lower-tier 164 of the Fresnel reflector 162 with an incoming detection beam spread 172 and a reflected beam 174 directed at detector 32. It can be clearly seen in the figure that radiation enters below pyro-electric detector 32 reflects from lower-tier 164 of reflector array 162 and is focused onto detector 32. FIG. 7 schematically illustrates optical centers of the thirteen Fresnel segments contained within the middle-tier 166 of Fresnel segments within multi-tier off-axis Fresnel reflector 162. FIG. 8 depicts the optical path for middle-tier 166 with an incoming detection beam spread 176 and a reflected beam 178. FIG. 9 schematically illustrates optical centers of the five Fresnel segments contained within the upper-tier 168 of Fresnel segments within multi-tier off-axis Fresnel reflector 162. FIG. 10 depicts the optical path for upper-tier 168 with an incoming detection beam spread 180 and a reflected beam 182. In FIG. 11 a back portion 170 is shown which encloses motion detector unit 150. The curve of Fresnel reflector 162 is clearly visible in this figure for focusing the beam toward detector 32.

Figure 12A:
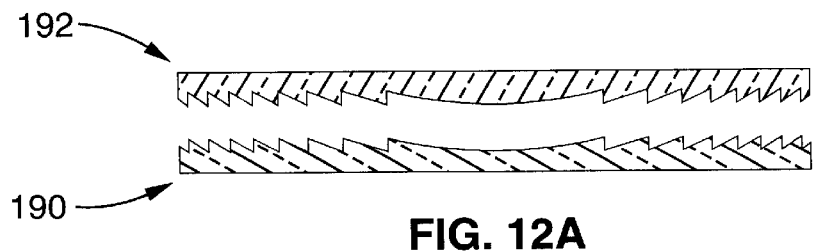
FIG. 12A through FIG. 12D is a flow diagram in cross-section views of a Fresnel master from which off-axis Fresnel segments are being cut according to an aspect of the present invention.
Figure 12B:
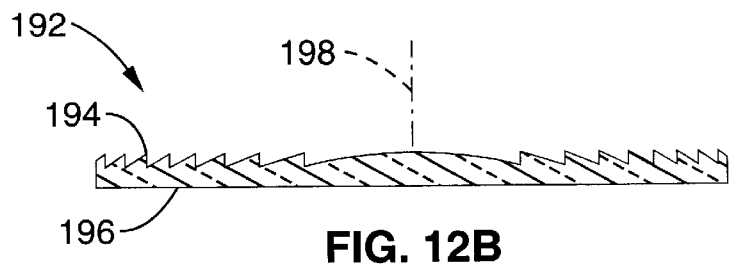
Figure 12C:
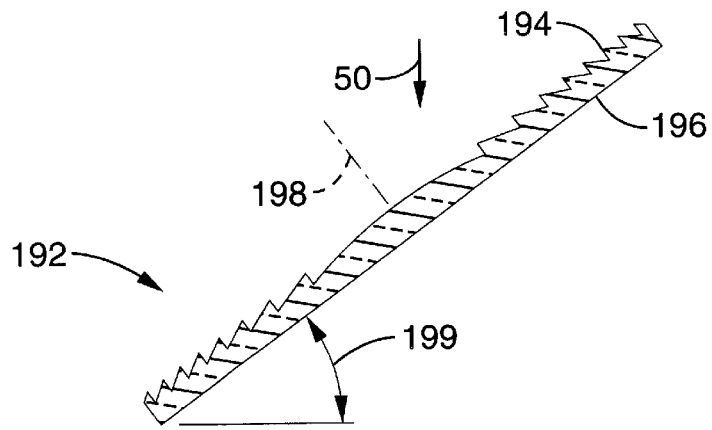
Figure 12D:
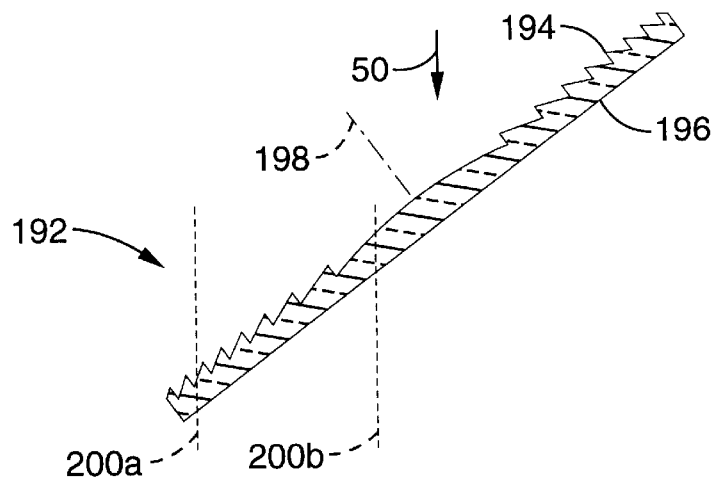
Figure 13:
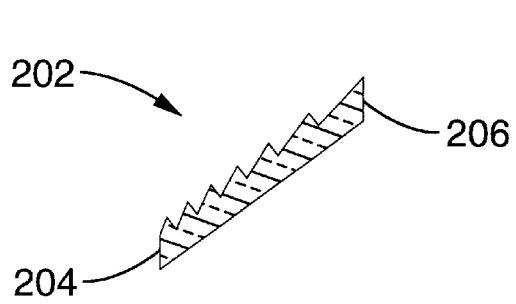
FIG. 13 is a cross-section view of the off-axis Fresnel segment shown being cut in FIG. 12D.
Figure 14:
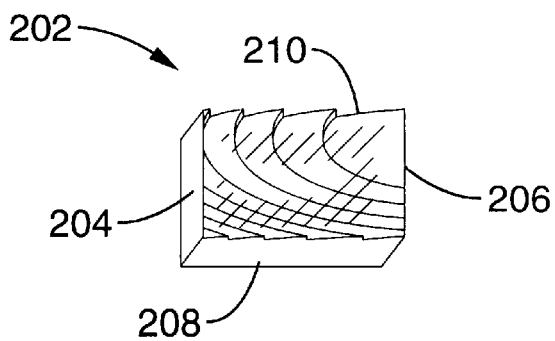
FIG. 14 is a perspective view of the off-axis Fresnel segment of FIG. 13.

FIG. 12A through FIG. 12D illustrate a method of creating a single off-axis Fresnel segment from a positive Fresnel master for use in assembling a mold pattern according to the present invention. In FIG. 12A a Fresnel positive master 190 is shown as a tool from which a negative Fresnel master, or tool, 192 has been molded. The negative Fresnel master, or tool, may also be referred to as a negative blank. In FIG. 12B, Fresnel negative tool 192 is shown with ring-faceted reflecting front surface 194 and substantially non-optical planar rear surface 196. Fresnel tool 192 is shown with a curving center section having optical axis 198. FIG. 12C shows Fresnel tool 192 rotated to an angle 199 corresponding to the angle of the cut associated with fitting the segment into the Fresnel array. FIG. 12D depicts a pair of off-axis sever lines 200a, 200b, from between which the Fresnel segment is to be severed from Fresnel tool 192. The Fresnel segment is then preferably cut on the transverse direction to form a rectangular Fresnel segment which may be subsequently fit within the reflector housing or for attachment to adjacent tiers of Fresnel segments. It will be appreciated that the majority of Fresnel segments utilized according to the present invention are not removed from the center of the Fresnel blank, but are separated from off-axis regions of an associated Fresnel master, or equivalent. FIG. 13 illustrates the separated off-axis Fresnel segment 202 having a first end 204, and a second end 206 that are configured for edge-to-edge attachment to adjacent Fresnel segments as assembled into a mold pattern for the non-planar Fresnel reflector array. FIG. 14 is a perspective view of off-axis Fresnel segment 202 shown in FIG. 13, which has a lower end 208 and an upper end 210.

Figure 15:
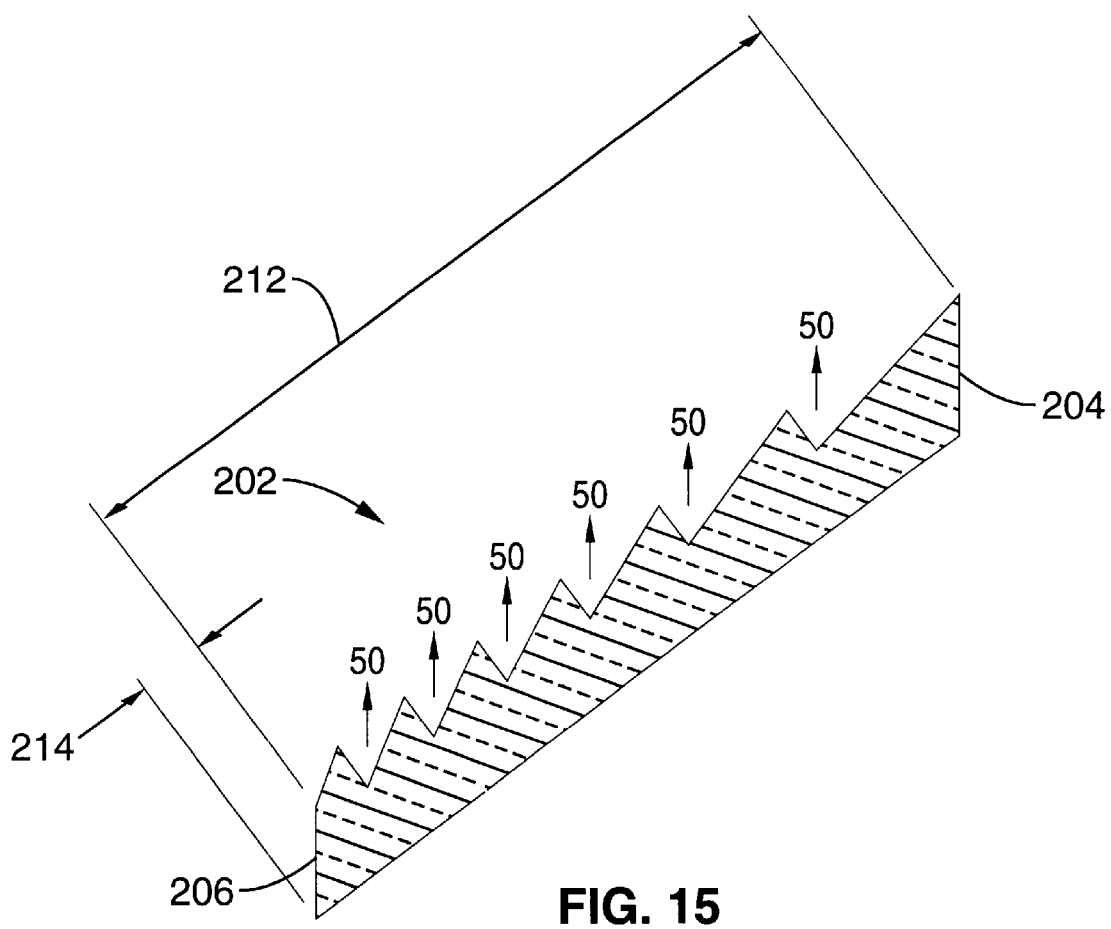
FIG. 15 is a detailed cross-section view of the Fresnel segment of FIG. 13, showing the pull direction of the molding process.
Figure 19A:
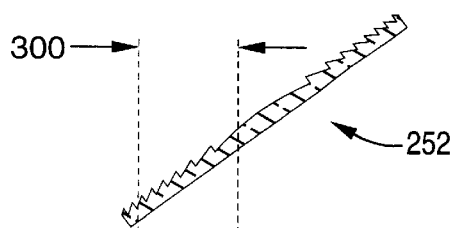
FIG. 19A through FIG. 19M is a flow diagram showing cross-section views of Fresnel segments being cut from Fresnel masters according to an aspect of the present invention.
Figure 19B:
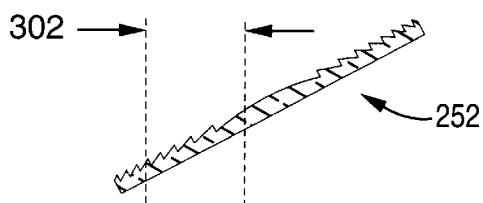
Figure 19C:
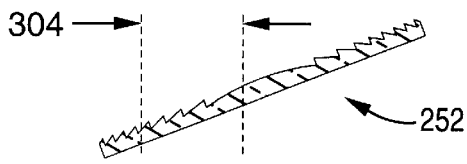
Figure 19D:
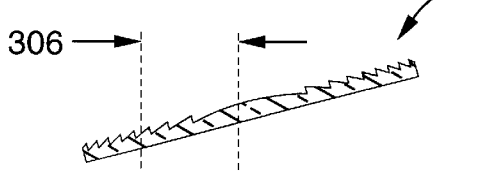
Figure 19E:
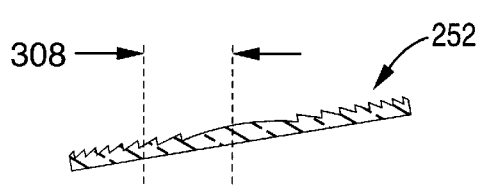
Figure 19F:
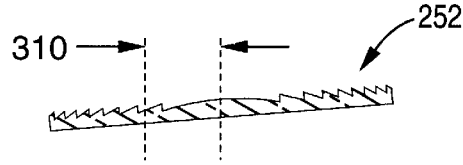
Figure 19G:
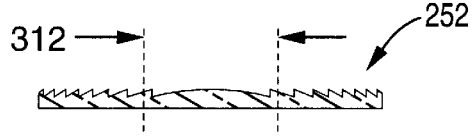
Figure 19H:
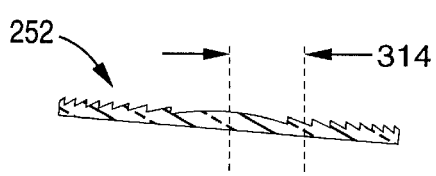
Figure 19I:
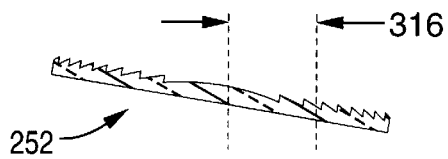
Figure 19J:
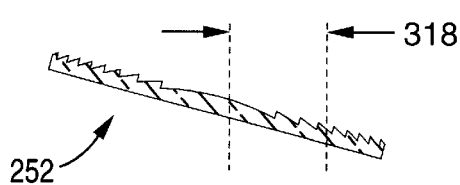
Figure 19K:
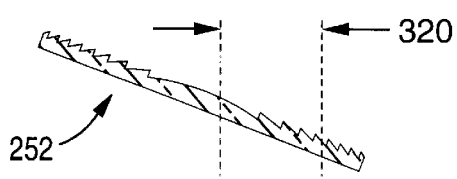
Figure 19L:
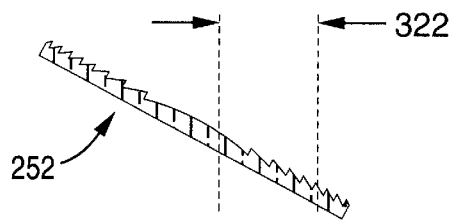
Figure 19M:
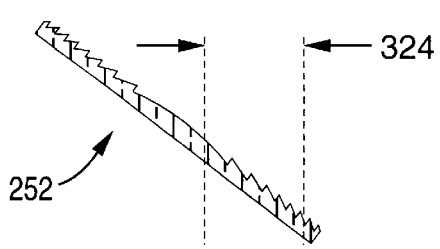

FIG. 15 is a detailed view of off-axis Fresnel segment 202 of FIG. 13 which illustrates the mold release pull direction 50 in relation to the farthest recesses of the Fresnel segment. It can be seen in relation to the steps and rings that no inclusive areas exist within the Fresnel segment with respect to the given pull direction. The Fresnel segment is shown at length 212, with extra surface material 214 being necessary for creating the proper joint angles for the given thickness of the Fresnel blank.

FIG. 16A through FIG. 16H depict a process 250 for severing off-axis Fresnel segments from a Fresnel master and subsequent assembly into a mold pattern. FIG. 16A represents a Fresnel master 252 with optical axis 254 from which an off-axis section 256 is shown preparatory to separation from blank 252 to form a Fresnel segment 258 having surface 260. The extended region beyond the surface of segment 258 (bounded by a dashed line) is necessary to provide subsurface material for joining the Fresnel segment to an adjacent Fresnel segment. FIG. 16B shows Fresnel segment 256 separated from blank 252 with orthogonal cuts. Rotating Fresnel segment 256 ninety degrees (90°) results in the segment view of FIG. 16C which illustrates, by dashed lines, the angles that should be cut into Fresnel segment 256 to allow for proper joining with adjacent Fresnel segments within an assembled mold pattern. Fresnel segment 256 is rotated to the intended angle within the mold array of the pattern in FIG. 16D. Pursuant to the removal of unnecessary material, Fresnel segment 262 shown in FIG. 16E, is produced. Although the segments for the mold pattern may be directly connected together, it is preferable that each be attached to a backing piece, such as an angled block 264 as shown in FIG. 16F to create an angled element 266 as shown in FIG. 16G which facilitates positioning and proper alignment. The angled element 266 is joined to other similarly formed elements in FIG. 16H to complete the assembly of a single reflector tier 268 comprising off-axis Fresnel reflector segments. It will be appreciated that as an alternative to the angled block, a base member (or support) may be created having a single surface which is configured for receipt of the plurality of Fresnel reflector segments which comprise a single or multiple tier array. However, the use of a single block eliminates the ability to adjust the joints in the reflective front surface to a desired configuration.

An alternative process for creating the mold patterns for a non-planar Fresnel reflector is depicted in FIG. 17A through FIG. 17H. The process is similar to that depicted in FIG. 16A through FIG. 16H; however, here the edges of the Fresnel segments are ground, or cut, after being attached to the angled blocks, instead of prior to attachment. An identical Fresnel segment 256 is shown in FIG. 17A being identified in the proper off-axis position in relation to blank 252, and removed as shown in FIG. 17B. Fresnel segment 256 is turned on edge to improve illustration clarity in FIG. 17C and the extra material to be removed is shown by dashed lines. Fresnel segment 256 is rotated into the proper destination angle and fastened to an angled block 264 in FIG. 17D to form the non-finished angled element 266 as shown in FIG. 17E. The angled element 266 is then cut, or ground, to remove the extra portions shown in FIG. 17F to arrive at a finished angled element 266, containing segment 262, of FIG. 17G that is assembled into the mold pattern 268 of FIG. 17H for a single-tier non-planar Fresnel reflector. It will be appreciated that the preceding technique may be utilized for creating mold patterns containing any desired number of individual Fresnel segments that have been joined into a single reflector. It will be further appreciated that any number of tiers may be similarly fabricated and joined to create a multi-tier non-planar Fresnel reflector array. Furthermore, it should be appreciated that numerous techniques may be alternatively utilized for removing off-axis segments from a Fresnel blank without departing from the teachings of the present invention.

Another alternative process 270 for creating the mold patterns for a non-planar Fresnel reflector is depicted in FIG. 18A through FIG. 18I. The process is somewhat similar to those depicted in FIG. 16A through FIG. 16H, and FIG. 17A through FIG. 17H, however, the segments are preferably cut utilizing wire Electro-Discharge Machining (EDM) or the like.

Figure 20A:
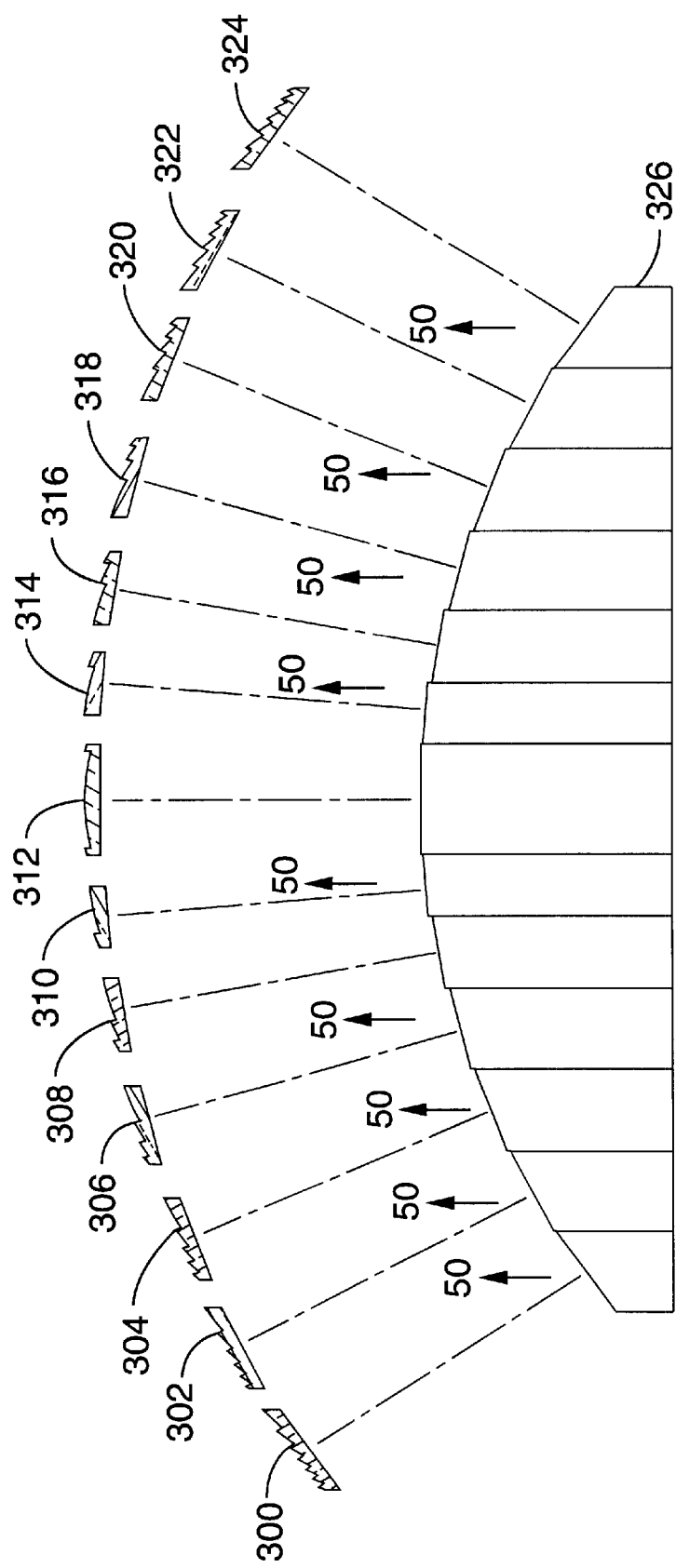
FIG. 20A and FIG. 20B are schematic side views of the Fresnel segments depicted in FIG. 19A through FIG. 19M being positioned for assembly into a single tier negative mold pattern (FIG. 20A) and after assembly (FIG. 20B).
Figure 20B:
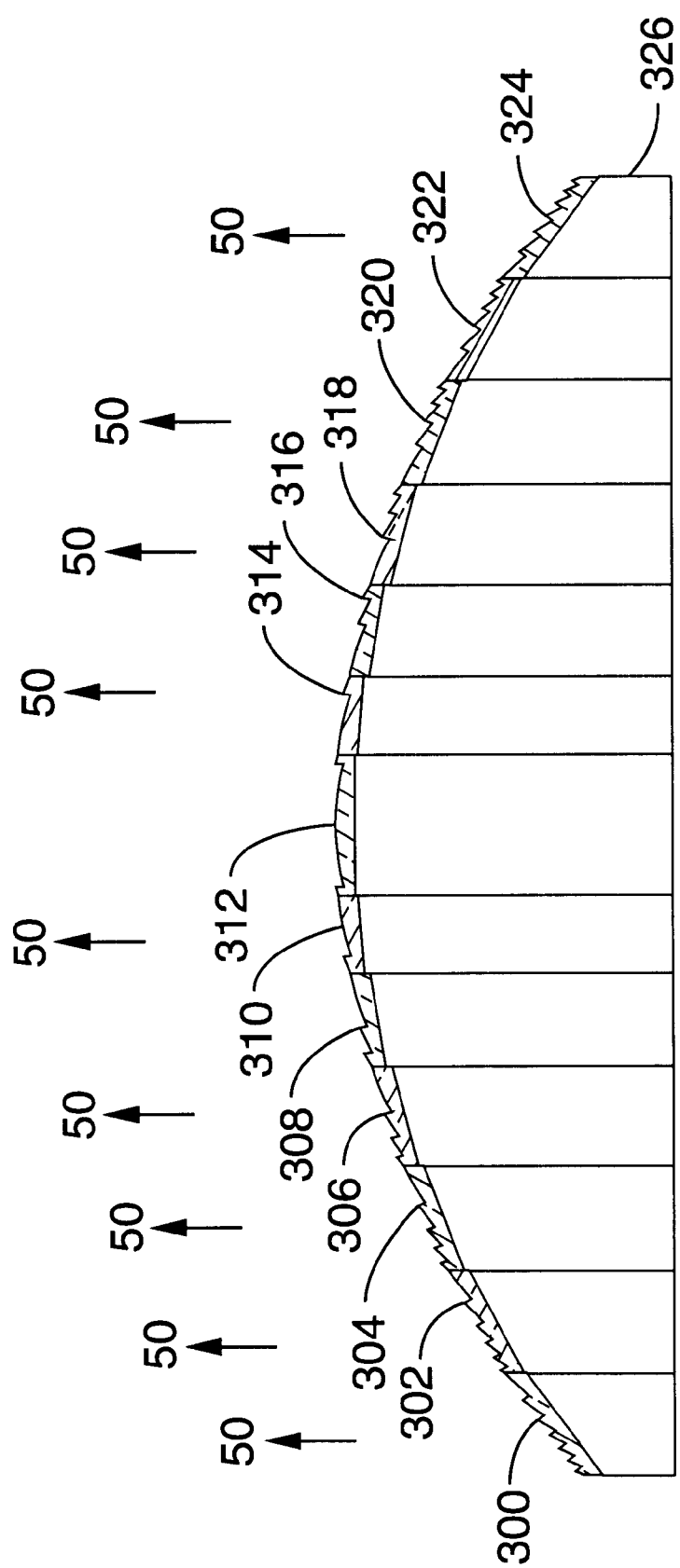
Figure 21:
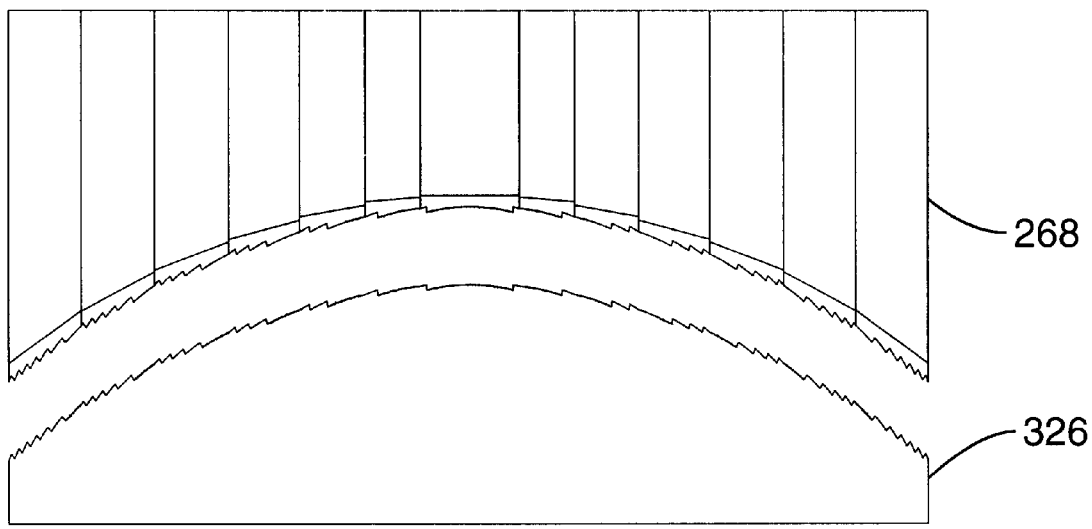
FIG. 21 is a schematic side view of assembled electroform positive Fresnel segments which form a positive mold pattern according to an aspect of the present invention, shown with the removal of a molded electroform tool negative.
Figure 22:
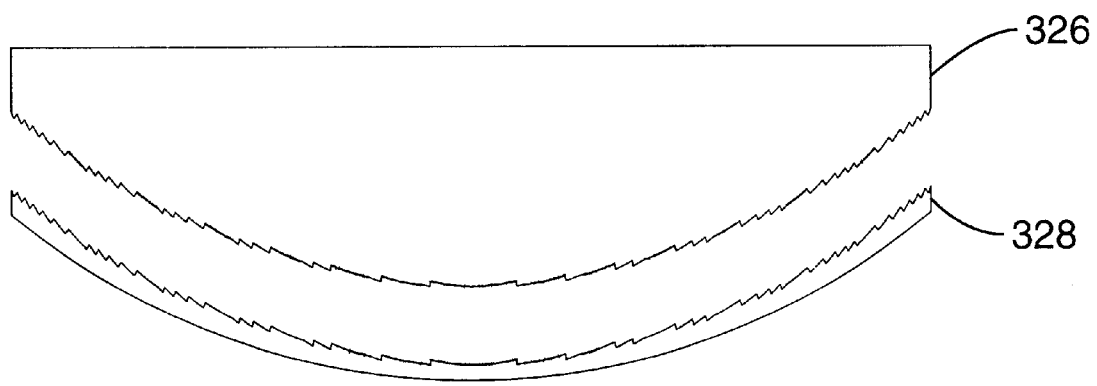
FIG. 22 is a schematic side view of the electroform tool negative of FIG. 21 from which a non-planar Fresnel array part is shown being removed.

The creation of thirteen elements for a negative mold pattern is depicted in FIG. 19A through FIG. 19M which illustrates individual Fresnel segments 300 through 324 being cut from a Fresnel master 252 at various angles in a process generally depicted in FIG. 12A through FIG. 12D. FIG. 20A illustrates individual separated Fresnel segments 300 through 324 being assembled into a negative mold pattern 326 having a pull direction 50. FIG. 20B illustrates the assembled mold pattern 326 which is devoid of molding inclusions. It will be appreciated that each off-axis Fresnel segment was positioned with the edge associated with the side containing the center ring oriented toward the center of the non-planar Fresnel reflector array. FIG. 21 illustrates a mold pattern that may be alternatively created as an electroform positive 268, such as depicted in FIG. 16A–FIG. 16H and FIG. 17A–FIG. 17H. The positive mold pattern can be utilized for subsequent molding of an electroform negative 324 of homologous shape to that of the mold pattern of FIG. 20B. FIG. 22 is an electroform negative (or tool) 326 being used for forming a final part 328 (positive) which provides the reflector for the detector.

Assembling the angled elements into a mold pattern may be accomplished as shown in FIG. 16A through FIG. 16H, FIG. 17A through FIG. 17H, FIG. 18A through FIG. 18I, or by alternative processes encompassing any desired segment alignments. FIG. 23 through FIG. 28 exemplify two general approaches to the alignment of Fresnel segments within a mold pattern.

Figure 23:
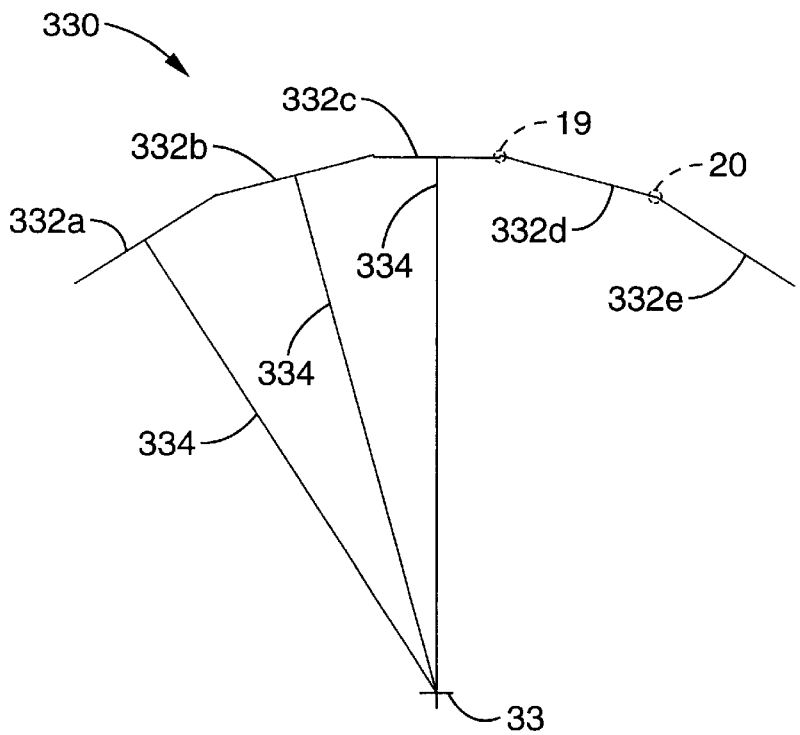
FIG. 23 is a schematic diagram showing Fresnel segments positioned at constant radial distance from a focal point (detector) according to an aspect of the present invention.
Figure 24:
FIG. 24 is a detailed view of an uneven exposed edge as depicted in FIG. 23.
Figure 25:
FIG. 25 is a detailed view of another uneven exposed edge as depicted in FIG. 23.

FIG. 23 illustrates positioning 330 of Fresnel segments 332a through 332b to provide a predetermined radial distance 334 from the optical center of the detector. It will be appreciated that each Fresnel segment is therefore positioned to achieve the optimal focus onto the detector. However, it should be recognized that the resultant joints between adjacent segments are uneven, as shown in the detailed views of FIG. 24 and FIG. 25.

Figure 26:
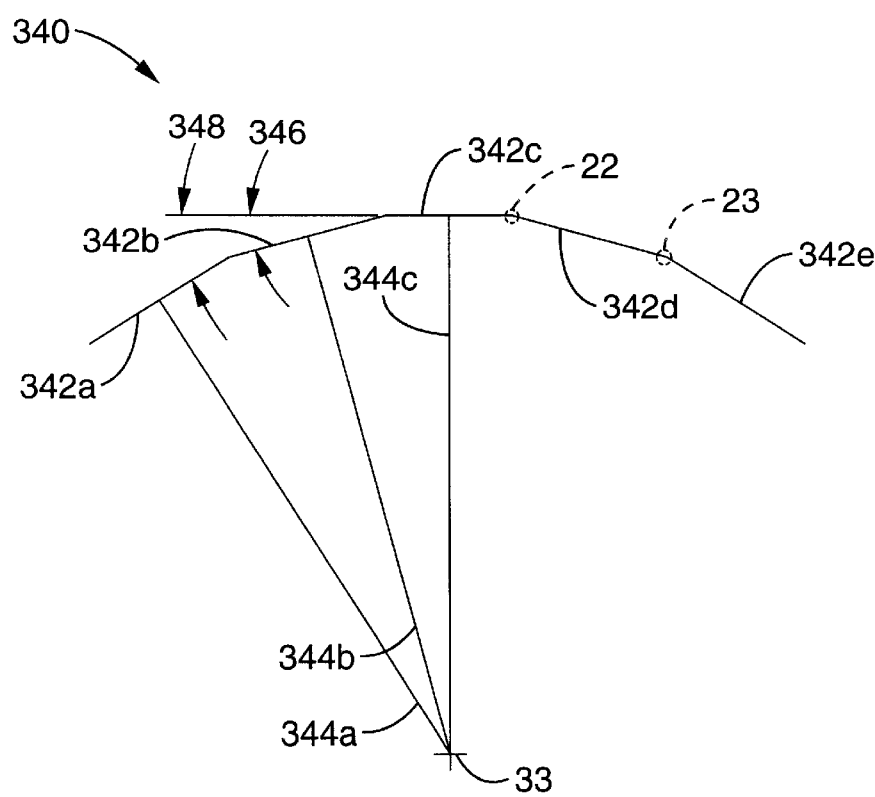
FIG. 26 is a schematic diagram showing Fresnel segments positioned in the array so that the faces of the Fresnel segments are joined flush with one another according to an aspect of the present invention.
Figure 27:
FIG. 27 is a detailed view of a smooth segment transition as depicted in FIG. 26.
Figure 28:
FIG. 28 is a detailed view of another smooth segment transition as depicted in FIG. 26.

FIG. 26 illustrates positioning 340 of Fresnel segments 342a through 342e to provide substantially flush joint faces. The flush joint faces are characterized by having adjoining face edges being flush with one another so that the reflective surface of one face transitions to the next without reflective surface discontinuity. Lines representing segment surfaces 342a through 342e are shown at associated radial distances 344a–344c, that are at respective radial distances from the detector of thirty two point three eight millimeters, (32.38 mm), thirty two point three five millimeters (32.35 mm), and thirty two point five zero millimeters (32.50 mm) with the segment surfaces 342a–342c being cut to lengths of nine point nine zero millimeters (9.90 mm), nine point seven zero millimeters (9.70 mm), and seven point six zero millimeters (7.60 mm). The associated joining angles at a first joining angle 346 of fifteen point two zero degrees (15.20°), with a second joining angle 348 of thirty two point five zero degrees (32.50°). Aligning the Fresnel segments to create flush surface joints reduces the accuracy of focus on the detector, however, testing has shown that this focal mismatch is minor in relation to the benefits gained by utilizing flush jointed segments.

It will be appreciated that a non-planar Fresnel reflector array according to the present invention can be utilized for either focusing light from a distributed target zone onto a focal zone, or for directing the light which is produced by an illumination source near the focal zone to a distributed target zone.

FIG. 29 through FIG. 35 depict the Fresnel reflector arrays manufactured from Fresnel mold patterns according to the present invention which are embodied within illuminated beacons. Referring first to FIG. 29 through FIG. 31 a radial pattern illuminator 350 is depicted having a lower body 352, Fresnel reflector 354, illumination source 356, illumination source base 358, and lens housing 360. Illuminated beacon 350 directs the light from illumination source 356, such as a halogen lamp, to portions of the area surrounding the beacon. It will be appreciated that the majority of the illumination from illumination source 356 is not subject to reflection from the Fresnel reflector array and is instead directly dispersed, passing from illumination source 356 through lens housing 360. Another portion of the illumination from illumination source 356 impinges on Fresnel reflector 354 and is reflected into a desired pattern. Fresnel reflector 354 reflects incoming light to increase light intensity within certain portions of the subtended arc, while blocking illumination from an arc behind Fresnel reflector 354.

Figure 32:
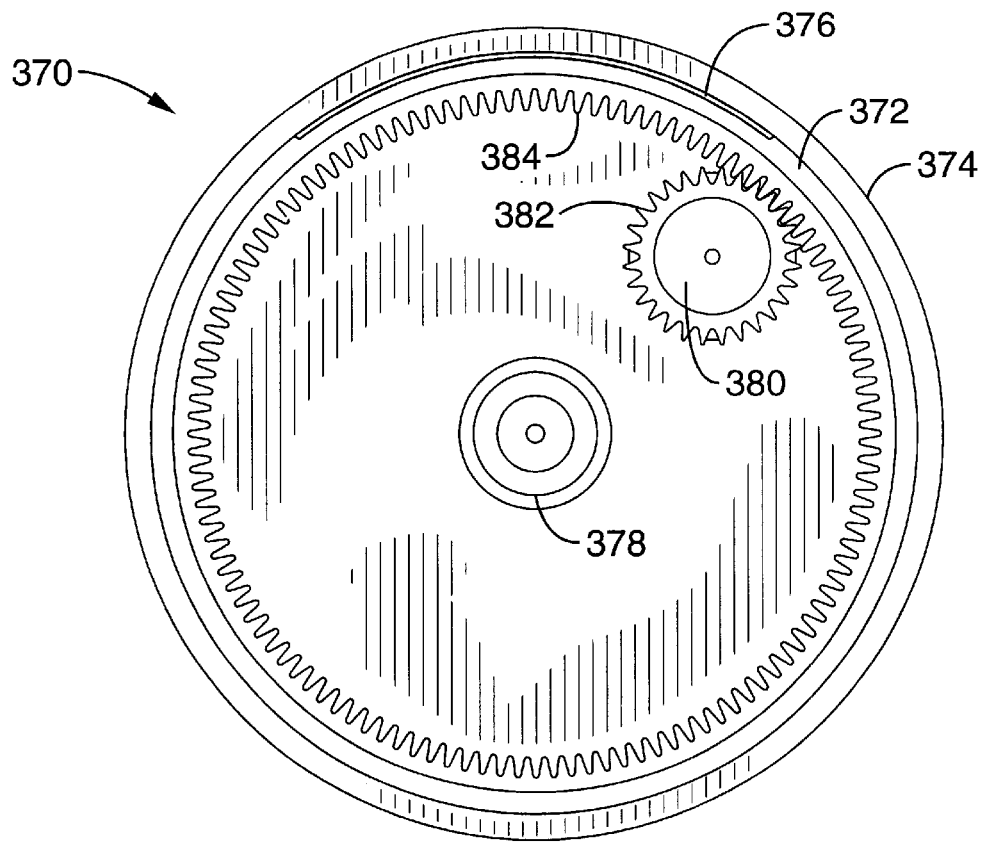
FIG. 32 is a bottom view of a drive mechanism for a rotating a light beacon which incorporates non-planar Fresnel arrays according to the present invention, showing a gear train for providing reflector rotation.
Figure 33:
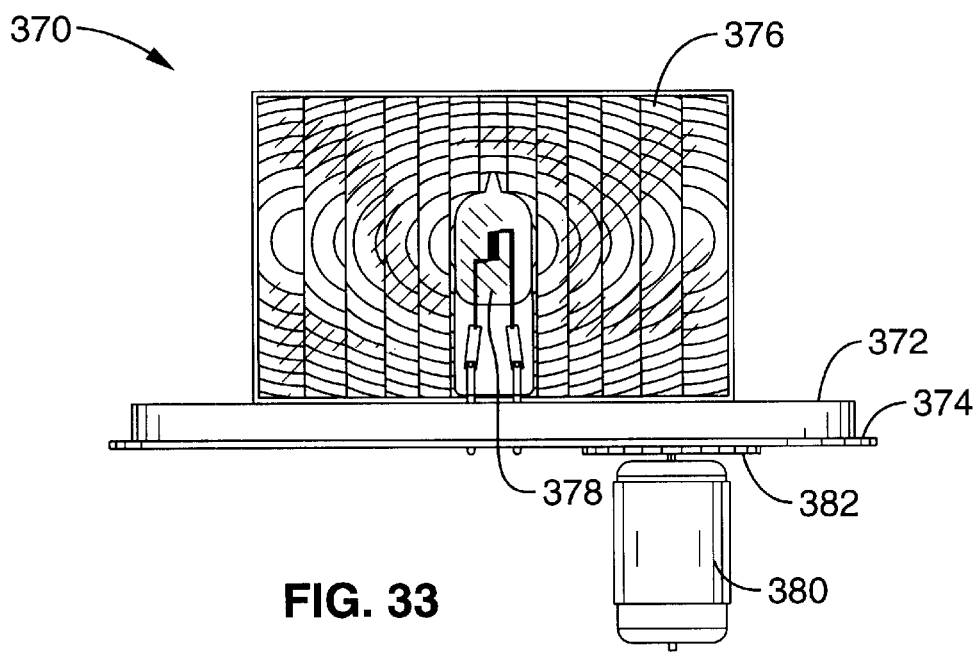
FIG. 33 is a side view of a rotating light beacon of FIG. 32, shown with lamp assembly in front of the Fresnel reflector, and a motor for driving the gear train of FIG. 32.

A number of applications also exist for beacons which are capable of generating a rotating light pattern. For example, FIG. 32 and FIG. 33 illustrate a rotating illumination element and reflector for use within a rotating beacon that generates a light output which may be characterized as "flashing". FIG. 32 depicts the underside of a rotating member 372 having a lip 374 which is configured to slidably rotate with a beacon housing (not shown). FIG. 33 depicts a Fresnel reflector 376 and an illumination source 378 are attached to rotating member 372. Fresnel reflector 376 receives light from illumination source 378 and directs it into an arc. It will be appreciated that the Fresnel reflector is preferably configured for non-uniform distribution of the light such that rapid flashing will be perceived by observers as the reflected light arc rotates. Rotating member 372 is driven by a motor 380 coupled to a pinion gear 382 which engages a gear train 384 about the interior perimeter of rotating member 372. In FIG. 33 the illumination source 378 and motor drive 380 are clearly visible.

Figure 34:
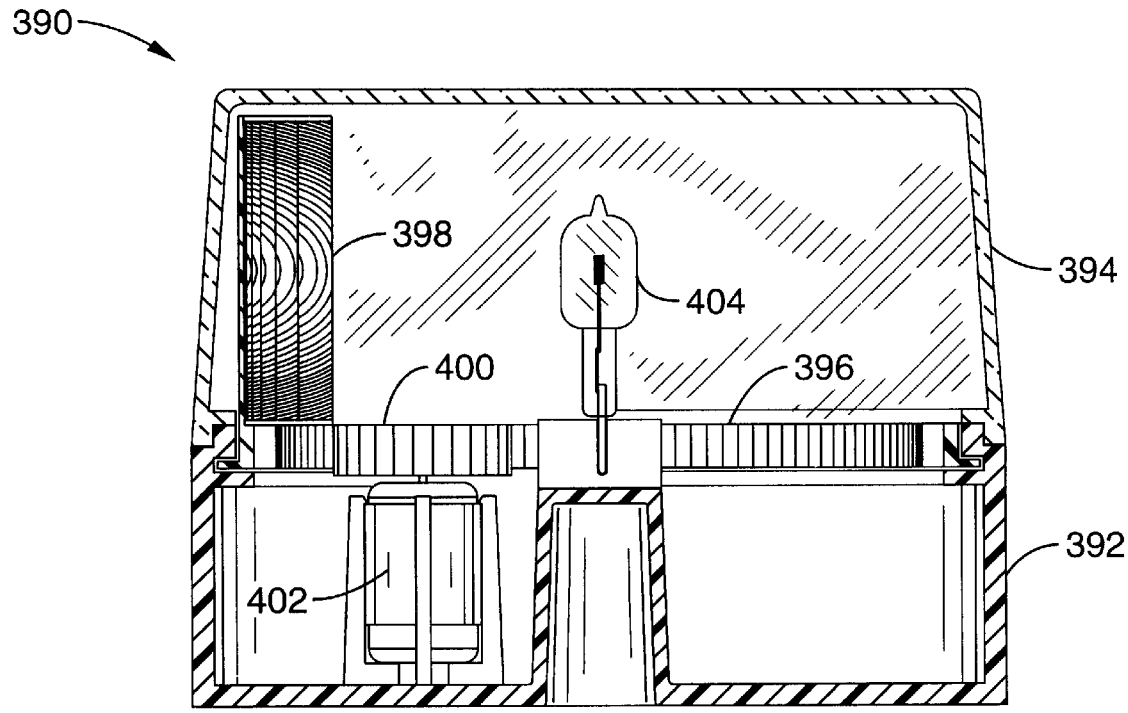
FIG. 34 is a side view in cross-section of an alternative embodiment of a rotating light beacon which incorporates non-planar Fresnel arrays according to the present invention, shown with a stationary light assembly and rotating Fresnel reflector.
Figure 35:
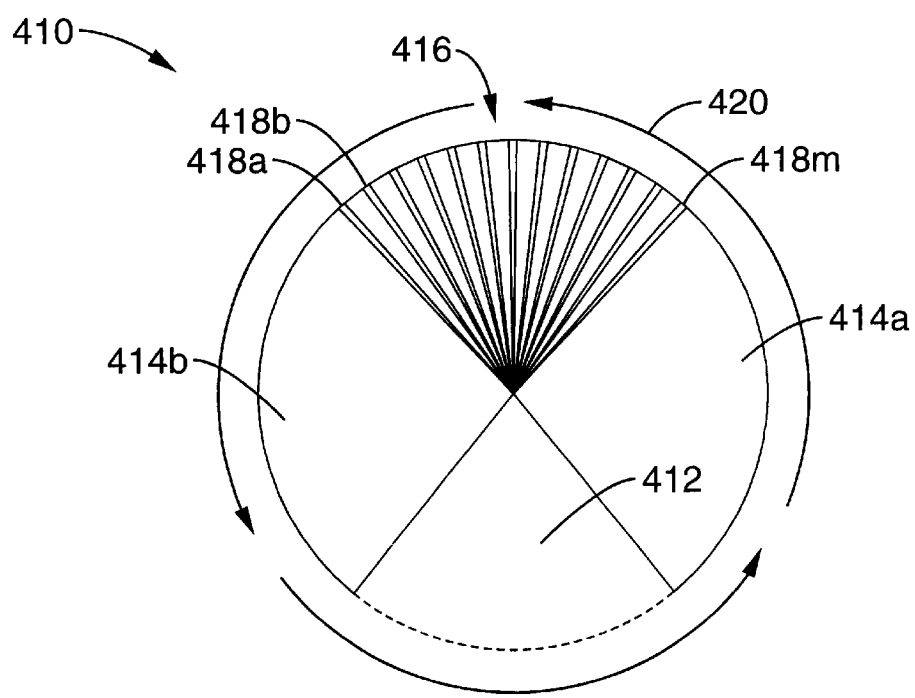
FIG. 35 is a schematic top plan view of light pattern output for the rotating light beacon of FIG. 34.

Referring now to FIG. 34 an embodiment is shown of a rotating light beacon 390 utilizing a non-planar Fresnel array according to the invention. A lower housing 392 supports a lens 394 and retains a rotating member 396 onto which a non-planar Fresnel array 398 is attached. Rotating member 396 has internal gear teeth which are coupled to a pinion gear 400 driven by motor 402. An illumination source 404 is shown fixedly attached to lower housing 392. The light output 410 from rotating beacon 390 is shown in FIG. 35 as a series of arcs. A non-illuminated arc region 412 is created behind the Fresnel reflector 398 as the light from illumination source 404 is blocked. Adjacent the non-illuminated arc 412 are directly illuminated arcs 414a, 414b, which are directly illuminated by light from illumination source 404. A reflection arc 416 contains both direct light from the illumination source and light which has been reflected from Fresnel reflector 398. The Fresnel reflector being preferably configured to direct the light to small zones within the arc 418a–418m, which will contain higher intensity light than in the remainder of the circle of illumination. Under rotation 420, the reflected illumination of segments 418a–418m will appear to an observer as attention getting flashes of light. It will be appreciated, therefore, that the manufacture of non-planar Fresnel arrays according to the present invention may be utilized for directing light to both a detector (or sensor), or may alternatively be utilized for directing light from a source of illumination to target areas, such as surrounding a beacon, or rotating beacon.

Accordingly, it will be seen that this invention provides various embodiments of non-planar Fresnel array mold patterns for use in manufacturing non-planar Fresnel reflector arrays containing off-axis Fresnel segments, and further describes methods for easily fabricating mold patterns that are inherently free of inclusions when manufacturing one-piece, monolithic, non-planar Fresnel reflectors. It will be appreciated that the teachings of the present invention may be implemented in various ways, to arrive at tools for the molding of non-planar Fresnel reflectors in a final form. Furthermore, the specific reflectors depicted within the description were provided by way of example, the actual number of segments, angles, and other parameters may be varied without departing from the teachings of the invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Reflector Element Tilt and Width (FIG. 5, 7, 9)

| Segment Number | Segment Tilt (degrees) | Segment Width (mm) |
|---|---|---|
| 01 | −32.5 | 9.90 |
| 02 | −15.2 | 9.70 |
| 03 | 0.0 | 7.60 |
| 04 | 15.2 | 9.70 |
| 05 | 32.5 | 9.90 |
| 06 | −36.8 | 5.10 |
| 07 | −28.6 | 4.20 |
| 08 | −21.7 | 3.60 |
| 09 | −15.7 | 3.20 |
| 10 | −10.2 | 3.00 |
| 11 | −5.0 | 2.90 |
| 12 | 0.0 | 2.80 |
| 13 | 5.0 | 2.90 |
| 14 | 10.2 | 3.00 |
| 15 | 15.7 | 3.20 |
| 16 | 21.7 | 3.60 |
| 17 | 28.6 | 4.20 |
| 18 | 36.8 | 5.10 |
| 19 | 32.5 | 9.90 |
| 20 | −18.2 | 6.30 |
| 21 | −8.4 | 4.90 |
| 22 | 0.0 | 4.60 |
| 23 | 8.4 | 4.90 |
| 24 | 18.2 | 6.30 |
| 25 | 32.5 | 9.90 |

What is claimed is:

1. A Fresnel reflector array, comprising:

a plurality of Fresnel segments;

each said Fresnel segment having an optical axis;

wherein said Fresnel segments are arranged edge-to-edge at a relative angular offset to farm a Fresnel reflector array; and wherein at least one of said Fresnel segments has a focal point along a path that is angularly offset from its optical axis.

2. A Fresnel reflector array as recited in claim 1:

wherein at least one of said Fresnel segments has a focal point along its optical axis.

3. A Fresnel reflector array as recited in claim 1:

wherein said array comprises an integral molded unit; and wherein said Fresnel segments are configured to substantially eliminate negative draft during molding.

4. A Fresnel reflector array as recited in claim 1:

wherein said Fresnel segments comprise individual Fresnel segments joined at their edges.

5. A Fresnel reflector array, comprising:

a plurality of Fresnel segments;

each said Fresnel segment having an optical axis;

wherein said Fresnel segments are arranged edge-to-edge at a relative angular offset to form a Fresnel reflector array;

wherein at least one of said Fresnel segments has a focal point along a path that is angularly offset from its optical axis; and wherein at least one of said Fresnel segments has a focal point along its optical axis.

6. A Fresnel reflector array as recited in claim 5:

wherein said array comprises an integral molded unit; and wherein said Fresnel segments are configured to substantially eliminate negative draft during molding.

7. A Fresnel reflector array as recited in claim 5, wherein said Fresnel segments comprise individual Fresnel segments joined at their edges.

8. A Fresnel reflector array, comprising:

a plurality of Fresnel segments;

each said Fresnel segment having an optical axis;

wherein said Fresnel segments are arranged edge-to-edge at a relative angular offset to form a Fresnel reflector army;

wherein said array comprises an integral molded unit;

wherein said Fresnel segments are configured to substantially eliminate negative draft during molding; and wherein at least one of said Fresnel segments has a focal point along a path that is angularly offset from its optical axis.

9. A Fresnel reflector array as recited in claim 8:

wherein at least one of said Fresnel segments has a focal point along its optical axis.

10. A Fresnel reflector array as recited in claim 8:

wherein said Fresnel segments comprise individual Fresnel segments joined at their edges.

11. A Fresnel reflector array, comprising:

a plurality of Fresnel segments;

each said Fresnel segment having an optical axis;

wherein said Fresnel segments are arranged edge-to-edge at a relative angular offset to form a Fresnel reflector array;

wherein said array comprises an integral molded unit;

wherein said Fresnel segments are configured to substantially eliminate negative draft during molding;

wherein at least one of said Fresnel segments has a focal point along a path that is angularly offset from its optical axis; and wherein at least one of said Fresnel segments has a focal point along its optical axis.

12. A Fresnel reflector array as recited in claim 11:

wherein said Fresnel segments comprise individual Fresnel segments joined at their edges.

13. A Fresnel reflector array, comprising:

a plurality of individual Fresnel segments;

each said Fresnel segment having an optical axis;

wherein said Fresnel segments are joined edge-to-edge at a relative angular offset to form a Fresnel reflector array;

wherein said array comprises an integral molded unit;

wherein said Fresnel segments are configured to substantially eliminate negative draft during molding;

wherein at least one of said Fresnel segments has a focal point along a path that is angularly offset from its optical axis; and wherein at least one of said Fresnel segments has a focal point along its optical axis.

14. A Fresnel reflector array, comprising:

a plurality of off-axis Fresnel segments;

wherein said Fresnel segments are arranged edge-to-edge at a relative angular offset to form a Fresnel reflector away; and wherein said Fresnel segments are configured to substantially eliminate negative draft during molding.

15. A Fresnel reflector array as recited in claim 14, wherein said array comprises an integral molded unit.

16. A Fresnel reflector array as recited in claim 14, wherein said Fresnel segments comprise individual Fresnel segments joined at their edges.

\* \* \* \* \*